US009425636B2

(12) United States Patent
Taniguchi et al.

(10) Patent No.: US 9,425,636 B2
(45) Date of Patent: Aug. 23, 2016

(54) OPERATION PLAN PREPARATION METHOD, OPERATION PLAN PREPARATION DEVICE, AND RECORDING MEDIUM

(71) Applicant: FUJITSU LIMITED, Kawasaki-shi, Kanagawa (JP)

(72) Inventors: Tsuyoshi Taniguchi, Kawasaki (JP); Yoshio Nakao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 523 days.

(21) Appl. No.: 14/026,530

(22) Filed: Sep. 13, 2013

(65) Prior Publication Data

US 2014/0012428 A1    Jan. 9, 2014

Related U.S. Application Data

(63) Continuation of application No. PCT/JP2011/056652, filed on Mar. 18, 2011.

(51) Int. Cl.
*H02J 7/00* (2006.01)
*H02J 3/38* (2006.01)
(Continued)

(52) U.S. Cl.
CPC ........... *H02J 7/0075* (2013.01); *G05B 13/041* (2013.01); *G06F 1/26* (2013.01);
(Continued)

(58) Field of Classification Search
CPC ...... H02J 2003/143; H02J 3/005; H02J 3/14; H02J 3/383; H02J 7/0075; B60L 11/1809; B60L 11/1838; B60L 11/184; B60L 11/1862; Y02T 10/7005; Y02T 10/7044; Y02T 10/7088; Y04S 10/14; Y04S 20/242; Y02E 60/12; Y02E 60/722; Y02B 70/3266; G06F 1/26; G06F 1/263; B60M 3/06
See application file for complete search history.

(56) References Cited

U.S. PATENT DOCUMENTS 8,330,415 B2 * 12/2012 Sato .................. B60L 3/12
                                                    180/65.29
2011/0125337 A1 * 5/2011 Zavadsky ............ G06F 1/263
                                                    700/291
(Continued)

FOREIGN PATENT DOCUMENTS

JP    11-326542          11/1999
JP    2005143218 A *     6/2005
(Continued)

OTHER PUBLICATIONS

International Search Report mailed Jun. 14, 2011 in corresponding International Application No. PCT/JP2011/056652.
(Continued)

*Primary Examiner* — Crystal J Barnes-Bullock
(74) *Attorney, Agent, or Firm* — Staas & Halsey LLP

(57) ABSTRACT

An operation plan preparation device includes a memory and a processor coupled to the memory. The processor executes a process including: generating a plurality of scenarios representing the possible set of supply and demand power curves that could occur under a given condition; first calculating an optimal operation plan by which the best evaluation value for a scenario in operation of a storage battery is obtained, and recording the evaluation value of that plan as a first evaluation value of that scenario; second calculating a second evaluation value for an operation plan candidate in the case when a scenario occurs in the operation of the storage battery; third calculating a difference between the first evaluation value and the second evaluation value relative to each scenario; and selecting the operation plan of the storage battery from among the plural operation plan candidates based on the difference.

9 Claims, 23 Drawing Sheets

(51) Int. Cl.
*H02J 7/35* (2006.01)
*H02J 7/32* (2006.01)
*G06F 1/26* (2006.01)
*G05B 13/04* (2006.01)

(52) U.S. Cl.
CPC ............... *H02J 3/383* (2013.01); *H02J 7/32* (2013.01); *H02J 7/35* (2013.01); *Y02E 60/12* (2013.01); *Y02E 60/722* (2013.01); *Y02T 10/7005* (2013.01); *Y02T 10/7044* (2013.01); *Y04S 10/14* (2013.01)

(56) References Cited

U.S. PATENT DOCUMENTS

| | | | | |
|---|---|---|---|---|
| 2013/0245850 | A1* | 9/2013 | Okayama | G06F 1/26 700/295 |
| 2014/0368154 | A1* | 12/2014 | Hanashima | B60M 3/06 320/101 |

FOREIGN PATENT DOCUMENTS

| | | |
|---|---|---|
| JP | 2006-304402 | 11/2006 |
| JP | 2008-141918 | 6/2008 |
| JP | 4245583 | 3/2009 |
| JP | 2010088147 A * | 4/2010 |
| JP | 2010098793 A * | 4/2010 |
| JP | 2011-2929 | 1/2011 |
| JP | 2011114945 A * | 6/2011 |

OTHER PUBLICATIONS

M. Kudo et al., "Forecasting Electric Power Generation of Photovoltaic Power System for Energy Network," *The Journal of the Institute of Electrical Engineers of Japan*, vol. 127, No. 7, 2007, pp. 847-853.

S. Takayama et al., "A Study on the Scheduling of Large-Scaled PV Power Station Output based on Solar Radiation Forecast," *The Journal of the Institute of Electrical Engineers of Japan*, vol. 129, No. 12, 2009, pp. 1514-1522.

* cited by examiner

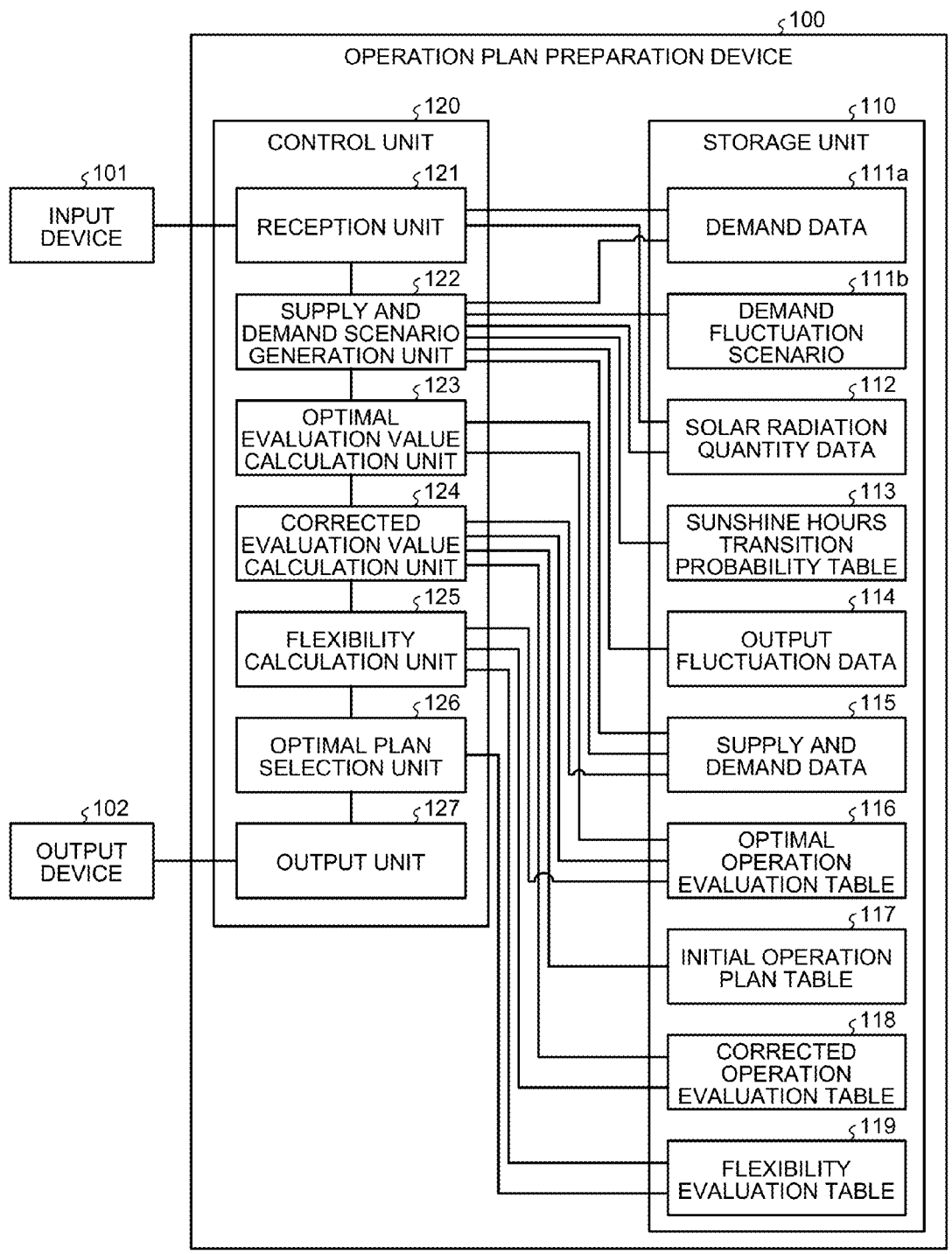

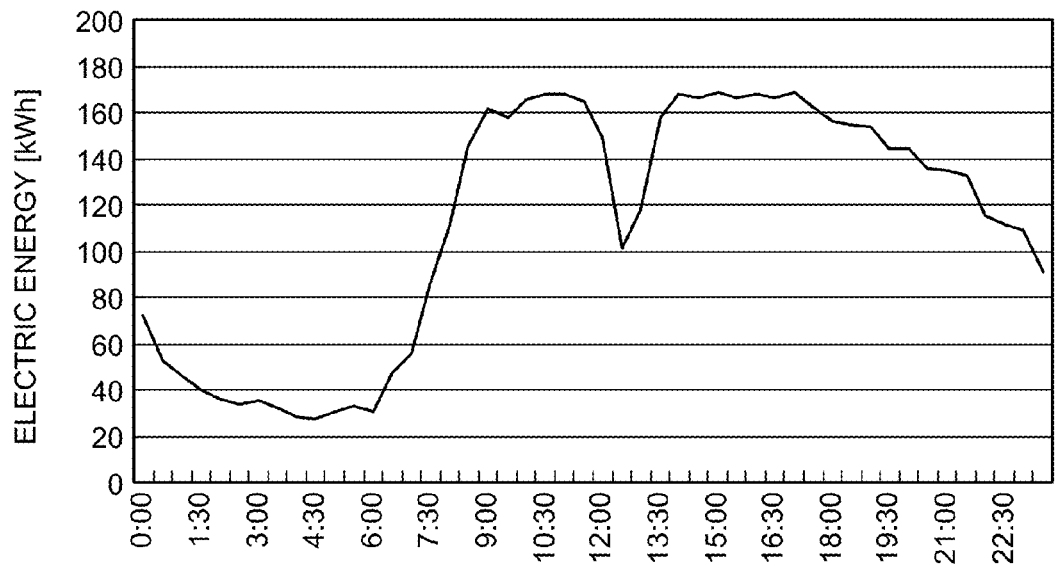

| SUPPLY AND DEMAND SCENARIO | EVALUATION VALUE BY OPTIMAL OPERATION PLAN [kW] | OPTIMAL CONTROL PARAMETER [kW] |
|---|---|---|
| 1 | 36 | 278 |
| 2 | 106 | 314 |
| ⋮ | ⋮ | ⋮ |
| M×N | 78 | 236 |

FIG.6

| INITIAL OPERATION PLAN | CONTROL PARAMETER [kW] |
|---|---|
| 1 | 50 |
| 2 | 60 |
| ⋮ | ⋮ |
| P | 150 |

FIG.7

| INITIAL OPERATION PLAN | SUPPLY AND DEMAND SCENARIO | EVALUATION VALUE OF OPTIMAL CORRECTED OPERATION PLAN RELATIVE TO INITIAL OPERATION PLAN P [kW] |
|---|---|---|
| 1 | 1 | 34 |
| | 2 | 42 |
| | ⋮ | ⋮ |
| | M×N | 66 |
| 2 | 1 | 0 |
| | 2 | 84 |
| | ⋮ | ⋮ |
| | M×N | 22 |
| ⋮ | ⋮ | ⋮ |
| P | 1 | 22 |
| | 2 | 0 |
| | ⋮ | ⋮ |
| | M×N | 54 |

FIG.8

| INITIAL OPERATION PLAN | SUPPLY AND DEMAND SCENARIO | FLEXIBILITY EVALUATION RELATIVE TO INITIAL OPERATION PLAN P [kW] |
|---|---|---|
| 1 | 1 | 2 |
| | 2 | 64 |
| | ⋮ | ⋮ |
| | M×N | 12 |
| 2 | 1 | 36 |
| | 2 | 22 |
| | ⋮ | ⋮ |
| | M×N | 56 |
| ⋮ | ⋮ | ⋮ |
| P | 1 | 14 |
| | 2 | 106 |
| | ⋮ | ⋮ |
| | M×N | 24 |

FIG.19

| SUPPLY AND DEMAND SCENARIO | EVALUATION VALUE BY OPTIMAL OPERATION PLAN [kg-$CO_2$] | OPTIMAL CONTROL PARAMETER [kW] |
|---|---|---|
| 1 | 17 | 278 |
| 2 | 48 | 314 |
| ⋮ | ⋮ | ⋮ |
| M×N | 32 | 236 |

FIG.20

| INITIAL OPERATION PLAN | SUPPLY AND DEMAND SCENARIO | EVALUATION VALUE OF OPTIMAL CORRECTED OPERATION PLAN RELATIVE TO INITIAL OPERATION PLAN P [kg-$CO_2$] |
|---|---|---|
| 1 | 1 | 16 |
|  | 2 | 18 |
|  | ⋮ | ⋮ |
|  | M×N | 30 |
| 2 | 1 | 0 |
|  | 2 | 34 |
|  | ⋮ | ⋮ |
|  | M×N | 10 |
| ⋮ | ⋮ | ⋮ |
| P | 1 | 10 |
|  | 2 | 0 |
|  | ⋮ | ⋮ |
|  | M×N | 24 |

FIG.21

| INITIAL OPERATION PLAN | SUPPLY AND DEMAND SCENARIO | FLEXIBILITY EVALUATION RELATIVE TO INITIAL OPERATION PLAN P [kg-$CO_2$] |
|---|---|---|
| 1 | 1 | 1 |
| | 2 | 30 |
| | ⋮ | ⋮ |
| | M×N | 2 |
| 2 | 1 | 17 |
| | 2 | 14 |
| | ⋮ | ⋮ |
| | M×N | 22 |
| ⋮ | ⋮ | ⋮ |
| P | 1 | 7 |
| | 2 | 48 |
| | ⋮ | ⋮ |
| | M×N | 8 |

FIG.22

| SUPPLY AND DEMAND SCENARIO | EVALUATION VALUE BY OPTIMAL OPERATION PLAN [million yen] | OPTIMAL CONTROL PARAMETER [kW] |
|---|---|---|
| 1 | 36 | 278 |
| 2 | 106 | 314 |
| ⋮ | ⋮ | ⋮ |
| M×N | 78 | 236 |

FIG.23

| INITIAL OPERATION PLAN | SUPPLY AND DEMAND SCENARIO | EVALUATION VALUE OF OPTIMAL CORRECTED OPERATION PLAN RELATIVE TO INITIAL OPERATION PLAN P [million yen] |
|---|---|---|
| 1 | 1 | 34 |
|  | 2 | 42 |
|  | ⋮ | ⋮ |
|  | M×N | 66 |
| 2 | 1 | 0 |
|  | 2 | 84 |
|  | ⋮ | ⋮ |
|  | M×N | 22 |
| ⋮ | ⋮ | ⋮ |
| P | 1 | 22 |
|  | 2 | 0 |
|  | ⋮ | ⋮ |
|  | M×N | 54 |

FIG.24

| INITIAL OPERATION PLAN | SUPPLY AND DEMAND SCENARIO | FLEXIBILITY EVALUATION RELATIVE TO INITIAL OPERATION PLAN P [million yen] |
|---|---|---|
| 1 | 1 | 2 |
|  | 2 | 64 |
|  | ⋮ | ⋮ |
|  | M×N | 12 |
| 2 | 1 | 36 |
|  | 2 | 22 |
|  | ⋮ | ⋮ |
|  | M×N | 56 |
| ⋮ | ⋮ | ⋮ |
| P | 1 | 14 |
|  | 2 | 106 |
|  | ⋮ | ⋮ |
|  | M×N | 24 |

| OPERATION PLAN ID | OPERATION MODE FOR EACH TIME BAND | | | | |
|---|---|---|---|---|---|
| | 0 TO 6 | 6 TO 10 | 10 TO 14 | 14 TO 18 | 18 TO 24 |
| 1 | 1 | 1 | 4 | 4 | 1 |
| 2 | 1 | 4 | 4 | 4 | 1 |
| 3 | 1 | 1 | 7 | 4 | 1 |
| 4 | 1 | 4 | 7 | 4 | 1 |
| 5 | 1 | 1 | 4 | 7 | 1 |
| 6 | 1 | 4 | 4 | 7 | 1 |
| 7 | 1 | 1 | 7 | 7 | 1 |
| 8 | 1 | 4 | 7 | 7 | 1 |
| ⋮ | ⋮ | ⋮ | ⋮ | ⋮ | ⋮ |
| P | 1 | 4 | 4 | 7 | 7 |

FIG.30

| PRE-SWITCH MODE | POST-SWITCH MODE | SWITCH COST [kWh] |
|---|---|---|
| 1 | 4 | 14 |
| 4 | 7 | 15 |
| 1 | 7 | 28 |
| 7 | 4 | 5 |
| 4 | 1 | 2 |
| 7 | 1 | 5 |

FIG.31

| TIME BAND | OPERATION MODE CANDIDATE |
|---|---|
| 0 TO 6 | 1 |
| 6 TO 10 | 1, 4 |
| 10 TO 14 | 4, 7 |
| 14 TO 20 | 4, 7 |
| 20 TO 24 | 1, 4, 7 |

FIG.32

COMMUNICATION DEMAND BEFORE FLUCTUATION

| COMMUNICATION DEMAND AFTER FLUCTUATION UNIT | 0-20 | 20-40 | 40-60 | 60-80 | 80- |
|---|---|---|---|---|---|
| N (10, 1) | 40 | 20 | 5 | 5 | 0 |
| N (30, 2) | 30 | 40 | 10 | 15 | 10 |
| N (50, 3) | 20 | 30 | 50 | 30 | 20 |
| N (70, 4) | 10 | 10 | 30 | 40 | 40 |
| N (90, 5) | 0 | 0 | 5 | 10 | 30 |

| COMMUNICATION DEMAND SCENARIO | EVALUATION VALUE BY OPTIMAL OPERATION PLAN [kWh] | OPTIMAL OPERATION PLAN |
|---|---|---|
| 1 | 160 | 14 (4  4  7  4  1) |
| 2 | 157 | 16 (4  7  7  4  1) |
| ⋮ | ⋮ | ⋮ |
| M | 118 | 2 (4  4  4  1  1) |

FIG.34

| OPERATION MODE FOR 6:00 TO 10:00 | COMMUNICATION SUPPLY AND DEMAND SCENARIO | EVALUATION VALUE OF OPTIMAL CORRECTED OPERATION PLAN RELATIVE TO OPERATION PLAN P | REGRET VALUE OF OPTIMAL CORRECTED OPERATION PLAN RELATIVE TO OPERATION PLAN P |
|---|---|---|---|
| 1 | 1 | 204 | 44 |
|  | 2 | 193 | 36 |
|  | ... | ... | ... |
|  | M | 160 | 0 |
| 4 | 1 | 157 | 0 |
|  | 2 | ... | ... |
|  | M | 151 | 33 |

OPERATION PLAN PREPARATION METHOD, OPERATION PLAN PREPARATION DEVICE, AND RECORDING MEDIUM

CROSS-REFERENCE TO RELATED APPLICATION

This application is a continuation application of International Application PCT/JP2011/056652 filed on Mar. 18, 2011 and designating the U.S., the entire contents of which are incorporated herein by reference.

FIELD

The present invention relates to an operation plan preparation method, an operation plan preparation device, and an operation plan preparation program.

BACKGROUND

In the current circumstances, countermeasures against global environmental problems are recognized as a global issue. The use of natural energy such as the energy from photovoltaic power generation has attracted attention as one of the countermeasures against the problems. However, since the photovoltaic power generation is easily influenced by the weather and its output is therefore instable, various devises have been made on the effective use of the photovoltaic power generation.

For dealing with the instability of the photovoltaic power generation, a method is given in which another kind of dispersion power source such as a storage battery or a fuel cell is operated according to an operation plan. This operation plan corresponds to, for example, a control parameter enabling the appropriate control over the discharge from a storage battery whose capacity is limited. For example, when a peak-shaving system of discharging the storage battery in the excess of power demand over a predetermined power value is employed as the control system for the storage battery, this power value corresponds to the operation plan. In the operation of a combination between the photovoltaic power generation and the storage battery, in general, an operation plan is prepared for operating the storage battery for one day so that an evaluation value is the best if the power supply and demand transits as predicted, based on the transition of power demand for the following day and the forecast of weather change made in the previous day.

For example, there is a method for managing a storage battery system which adapts the operation plan to the actual weather condition. In general, the weather forecast made after the knowledge of the actual weather condition of the day is more accurate than the forecast made in the previous day. Therefore, the operation benefit could be improved by correcting the operation plan in operation based on the actual weather condition of the day if the weather forecast made in the previous day deviated.

As another example, there is a method of preparing an operation plan for a storage battery by performing simulation so that the operation plan could be corrected effectively when the forecast deviated. In this method, the forecast deviation patterns with occurrence probabilities are constructed in advance based on past data, which correspond the past cases in which the forecast value of the power supply and demand deviated by a predetermined value or more. Then, the evaluation value of an operation plan for each forecast deviation pattern is calculated by simulating the adaptation of that operation plan to the deviation of the forecast. The evaluation value obtained for each forecast deviation pattern is weighted in accordance with the probability and added to the evaluation value when the forecast does not deviate, thereby calculating the overall evaluation value. Based on the overall evaluation value, an operation plan robust to the deviation of the forecast is prepared.

Patent Literature 1: Japanese Patent No. 4245583
Non Patent Literature 1: Mitsuru KUDO, Akira TAKEUCHI, Yousuke NOZAKI, Hisahito ENDO, and Jiro SUMITA, "Forecasting Electric Power Generation of Photovoltaic Power System for Energy Network", The Journal of the Institute of Electrical Engineers of Japan. B, Vol. 127 (2007), No. 7, pp. 847-853.
Non Patent Literature 2: Satoshi TAKAYAMA, Yuji IWASAKA, Ryoichi HARA, Hiroyuki KITA, Takamitsu ITO, Yoshinobu UEDA, Shuya MIWA, Naoya MATSUNO, Katsuyuki TAKITANI, and Koji YAMAGUCHI, "A Study on the Scheduling of Large-Scaled PV Power Station Output based on Solar Radiation Forecast", The Journal of the Institute of Electrical Engineers of Japan. B, Vol. 129 (2009), No. 12, pp. 1514-1521.

However, conventionally, there have been no techniques capable of preparing an operation plan that can deal with any weather change.

For example, in a general operation plan preparation method of preparing an operation plan so that the evaluation value becomes the best if the weather changes as forecasted, even if the operation plan is corrected during the operation of the storage battery, the plan cannot deal with the weather change in some cases. For example, if the forecast of the weather change is wrong, the amount of power generation by the photovoltaic power generation may be smaller than expected. In such a case, the amount of discharge from the storage battery is increased more than predicted; thus, the storage battery may run out of the power during the operation. Even if the operation plan is corrected under such a circumstance, it is difficult for the storage battery to supply enough power subsequently; thus, the operation benefit of the storage battery cannot be improved.

Even in the above-mentioned method of preparing an operation plan robust to the deviation of the forecast, it is difficult to be assured that the storage battery can deal with the weather change. In this method, only the case where the forecast value of the power supply and demand is deviated by a certain value or more is considered as the forecast deviation pattern; therefore, it is not always possible to deal with the case in which the degree of the forecast deviation is small, because a small forecast deviation might cause the shortage of the power left in the storage battery that leads to a large loss. For example, the deviation that the power demand outweighs the forecast value only temporarily does not have to be considered as the forecast deviation pattern. If the amount of remaining power in the storage battery is reduced to be less than the predicted amount due to such deviation, the storage battery may be unable to deal with the weather change. In this method, the overall evaluation value obtained by weighting and adding the evaluation value of the forecast deviation pattern to the evaluation value when the forecast is right in accordance with the probability is used; therefore, for example, if the overall evaluation value is increased by the evaluation value when the forecast is right, the evaluation value of the forecast deviation pattern is relatively less taken into consideration. As a result, the operation plan which is difficult to deal with the forecast deviation pattern may be selected.

SUMMARY

According to an aspect of the embodiments, an operation plan preparation method to be executed by a computer includes: generating a plurality of scenarios representing the possible set of supply and demand power curves that could occur under a given condition using a processor; first calculating, for every plural scenarios, an optimal operation plan by which the best evaluation value for a scenario in operation of a storage battery is obtained, and recording the evaluation value of the optimal operation plan as a first evaluation value of the scenario using the processor; second calculating, for every combination of plural operation plan candidates and plural scenarios, a second evaluation value for an operation plan candidate in the case when a scenario occurs in the operation of the storage battery using the processor; third calculating, for the every plural operation plan candidates, a difference between the first evaluation value and the second evaluation value on each scenario using the processor; and selecting the operation plan for the storage battery from among the plural operation plan candidates based on the difference using the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram depicting a function structure of an operation plan preparation device according to Embodiment 1;

FIG. 2 is a diagram depicting an example of a demand fluctuation scenario;

FIG. 3 is a diagram depicting an example of a sunshine hours transition probability table;

FIG. 6 is a diagram depicting an example of an initial operation plan table;

FIG. 7 is a diagram depicting an example of a corrected operation evaluation table;

FIG. 8 is a diagram depicting an example of a flexibility evaluation table;

FIG. 19 is a diagram depicting an example of an optimal operation evaluation table when an environmental load reduction effect is used;

FIG. 20 is a diagram depicting an example of a corrected operation evaluation table when an environmental load reduction effect is used;

FIG. 21 is a diagram depicting an example of a flexibility evaluation table;

FIG. 22 is a diagram depicting an example of an optimal operation evaluation table when a cost reduction effect is used;

FIG. 23 is a diagram depicting an example of a corrected operation evaluation table when the cost reduction effect is used;

FIG. 24 is a diagram depicting an example of a flexibility evaluation table;

FIG. 30 is a diagram depicting an example of a mode-switching cost;

FIG. 31 is a diagram depicting an example of the search range of the operation mode;

FIG. 32 is a diagram depicting an example (6:00-10:00) of the communication demand fluctuation probability table;

FIG. 33 is a diagram depicting an example of the optimal operation plan relative to the communication demand scenario; and FIG. 34 is a diagram depicting an example of the evaluation of the operation plan.

DESCRIPTION OF EMBODIMENTS

Figures 4, 5:
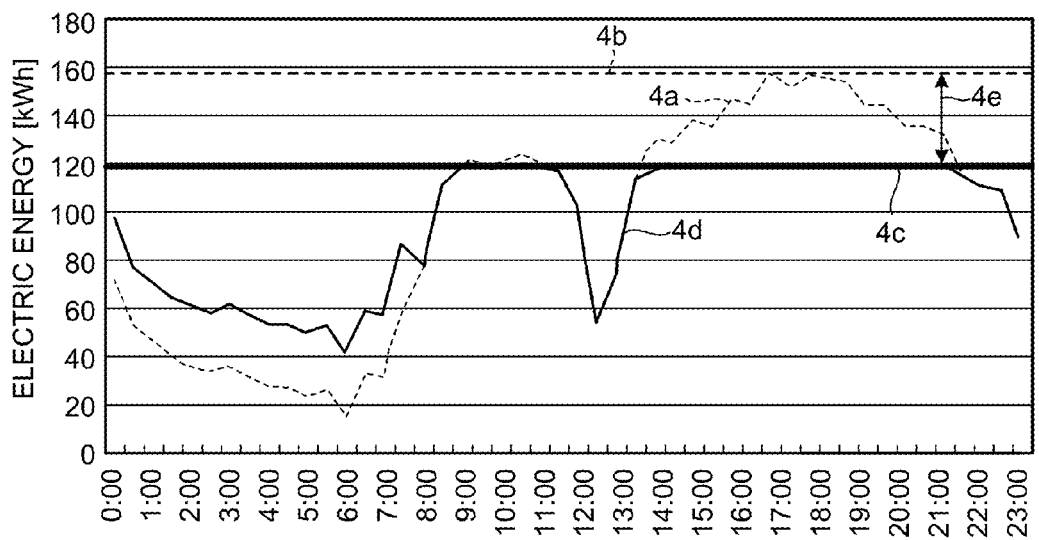
FIG. 4 is a diagram for describing the peak-shaving effect.
FIG. 5 is a diagram depicting an example of an optimal operation evaluation table.

Embodiments of an operation plan preparation method, an operation plan preparation device, and an operation plan preparation program to be disclosed in the present application are specifically described hereinafter with reference to the drawings. Note that the present invention is not limited by these embodiments. Any of these embodiments may be combined with another as appropriate in the range of allowing no contradiction of what is conducted in the process.

Embodiment 1

A configuration of an operation plan preparation device according to Embodiment 1 is described. This operation plan preparation device prepares, while anticipating that the operation plan for operating a storage battery for a day is corrected, an initial operation plan representing the operation plan from an operation start time t0 a correction time so as to deal with any weather change after the correction time. The operation start time is, for example, 0:00, and the correction time is, for example, 13:00. Although Embodiment 1 describes the case in which the operation plan preparation device prepares the initial operation plan, the present invention is not limited thereto. For example, while anticipating that the corrected operation plan representing the operation plan after the correction time is further corrected, the operation plan preparation device may prepare the corrected operation plan, like in the preparation of the initial operation plan. The operation start time and the correction time are not limited to those above and a person who uses the operation plan preparation device may set arbitrary values as these times.

FIG. 1 is a diagram depicting an example of a function structure of the operation plan preparation device according to Embodiment 1. As depicted in FIG. 1, an operation plan preparation device 100 includes a storage unit 110 and a control unit 120. The operation plan preparation device 100 is connected to an input device 101 and an output device 102.

The input device 101 receives the input of various kinds of information. For example, the input device 101 receives demand data 111a and the solar radiation quantity data 112. The input device 101 further receives, for example, an operation start time, an operation end time, and an operation plan correction time of a storage battery as the condition of specifying an operation plan to be prepared. Further, the input device 101 receives a start time t0, an end time t_e, initial sunshine hours h0, and a time increment range Δt as the condition of specifying the range of fluctuation of the solar radiation quantity that is supposed to be considered in the preparation of the operation plan. For example, the input device 101 corresponds to a keyboard, a mouse, a medium reader, or the like. The information received by the input device 101 will be specifically described later. The output device 102 outputs various kinds of information. For example, the output device 102 receives various kinds of information from an output unit 127, which is described later, and outputs the received information. For example, the output device 102 corresponds to a display or a monitor.

The storage unit 110 stores the demand data 111a, a demand fluctuation scenario 111b, the solar radiation quantity data 112, a sunshine hours transition probability table 113, output fluctuation data 114, and supply and demand data 115. The storage unit 110 further stores an optimal operation evaluation table 116, an initial operation plan table 117, a corrected operation evaluation table 118, and a flexibility evaluation table 119. The storage unit 110 corresponds to, for example, a storage device such as an optical magnetic disk, an optical disk, a magnetic disk, or a semiconductor memory element typified by RAM (Random Access Memory), ROM (Read Only Memory), flash memory (Flash Memory), or the like.

The demand data 111a are time-series data consisting of demand power values. For example, the demand data 111a are obtained by associating each time period and the demand power value in a day to each other. This demand power value is calculated from, for example, statistic data of the past power consumption.

The demand fluctuation scenario 111b represents the possibility of the transition of the demand in one day as a target for which an operation plan should be made. For example, the demand fluctuation scenario 111b represents the transition of the demand power value for every time period in a day, and is generated based on the demand data 111a. FIG. 2 is a diagram depicting an example of the demand fluctuation scenario. FIG. 2 represents time along the horizontal axis and the electric energy [kWh] along the vertical axis. FIG. 2 exemplifies the demand fluctuation scenario 111b of a day in a certain factory. In FIG. 2, there is one pattern for the demand fluctuation scenario 111b; however, the present invention is not limited thereto. For example, the demand fluctuation scenario 111b is different depending on what day of the week or the season of the year, and there may be M number of patterns for the demand fluctuation scenario 111b if a plurality of transitions is predicted. Note that M is a natural number.

The solar radiation quantity data 112 are the records of the past solar radiation quantity for every predetermined period of time. The solar radiation quantity includes, for example, values measured in the unit of sunshine hours. Here, the sunshine hours is the value defined as the time for which the ground is irradiated with direct sunlight at a predetermined intensity value (generally, 0.12 kW/m$^2$) or more without being blocked by clouds or the like. For example, the solar radiation quantity data 112 are obtained by recording, for each hour, the accumulated solar radiation quantity per unit area and the sunshine hours for one month in July 2010. The solar radiation quantity data 112 can be acquired by a database of Japan Weather Association.

The sunshine hours transition probability table 113 is a table representing the conditional probability P ($H_{after}|H_{before}$) where $H_{before}$ and $H_{after}$ denote the values before and after the transition respectively.

FIG. 3 is a diagram depicting an example of the sunshine-hours transition probability table. The horizontal direction of FIG. 3 represents the sunshine hours before the transition, $H_{before}$, which is sectioned into four items, "0.0", "0.1-0.5", "0.6-0.9", and "1.0". The vertical direction of FIG. 3 represents the sunshine hours after the transition, $H_{after}$, which is sectioned into 11 items from "0.0" to "0.1" at an interval of 0.1 hours. The sunshine hours transition probability table 113 depicted in FIG. 3 stores the conditional probability $P(H_{after}|H_{before})$ corresponding a transition in one hour. The conditional probability P is the value represented by a numeral of 0 to 1.

As depicted in FIG. 3, the sunshine hours transition probability table 113 stores that, for example, the conditional probability P where the sunshine hours fluctuates from $H_{before}$ "0.0" to the sunshine hours $H_{after}$ "0.0" after an hour is "0.86". Moreover, the sunshine hours transition probability table 113 stores that the conditional probability P where the sunshine hours fluctuates from $H_{before}$ "0.1-0.5" to the sunshine hours $H_{after}$ "0.3" after an hour is "0.07". The sunshine hours transition probability table 113 similarly stores the other conditional probabilities P. Note that the data configuration of the sunshine hours transition probability table 113 depicted in FIG. 3 is one example and the present invention is not limited thereto. For example, the sunshine hours from $H_{before}$ before the fluctuation may be sectioned into 11 items from "0.0" to "1.0" at an interval of "0.1".

The output fluctuation data 114 are the time-series data consisting of the amount of power generated by photovoltaic power generation. For example, the output fluctuation data 114 are obtained by associating the amount of power generation and each time period in a day to each other. The output fluctuation data 114 are generated by a supply and demand scenario generation unit 122, which is described later, and stored in the storage unit 110. For example, the output fluctuation data 114 include the output fluctuation scenario representing the transition of the amount of power generation of the photovoltaic power generation for every time period of a day. This output fluctuation scenario is later described in detail.

The supply and demand data 115 are time-series data consisting of the difference between the power demand in a power network in which the storage battery is operated and the output by the photovoltaic power generation. For example, the supply and demand data 115 are a set of the supply and demand scenarios each representing the transition of the amount of supply and demand electric energy that could occur subsequently relative to the given initial state.

The supply and demand data 115 are generated by the supply and demand scenario generation unit 122, which is described later, and stored in the storage unit 110. The supply and demand scenario is described later.

The optimal operation evaluation table 116 stores, for every plural scenarios, the operation plan by which the best evaluation value for a scenario is obtained (hereinafter referred to as "optimal operation plan") in the operation of the storage battery. For example, the optimal operation evaluation table 116 stores a record comprising the supply and demand scenario, the evaluation value by the optimal operation plan, and the optimal control parameter. Among these, "the supply and demand scenario" may be an identifier of the supply and demand scenario. The evaluation value by the optimal operation plan represents the best evaluation value among the evaluation values obtained from the simulation results for the case of operating the storage battery with various control parameters on the supply and demand scenario. For example, the peak-shaving effect is used for the evaluation value if the storage battery is operated by the peak-shaving method in which discharge is conducted when the power demand has exceeded a predetermined power value. This predetermined power value is also referred to as a discharge reference value. The optimal control parameter represents the control parameter of the storage battery at which the evaluation value by the optimal operation plan is obtained. For example, as the control parameter, the discharge reference value is used if the storage battery is operated by the peak-shaving method. The evaluation value is not limited to the peak-shaving effect; for example, an environmental load reduction effect, a cost reduction effect, or a combination of values thereof may be used as the evaluation value. The control parameter is not limited to the discharge reference value. For example, if the storage battery is operated by a constant discharge method, the combination of the discharge amount and the time period in which discharge has to be conducted serves as the control parameter. As another example, if the storage battery is operated by a surplus power absorbing method, the initial state of charge of the storage battery serves as the control parameter. The following description is made of the case in which the storage battery is operated by the peak-shaving method and the peak-shaving effect is used as the evaluation value.

Here, the peak-shaving effect is described. The peak-shaving effect is expressed by the evaluation value representing the effect when the storage battery is operated by the peak-shaving method, and is also the value evaluated according to how much the peak demand can be reduced. For example, the peak-shaving effect is expressed by the following formula (1).

(Peak-shaving effect)=(peak demand without peak-shaving)−(peak demand with peak-shaving)　　(1)

Note that the typical definition of the peak demand in Japan is the average power consumption [kW] for every 30 minutes, and for example, the value calculated by the simulation is used as the peak demand. For example, the peak demand is expressed by the following formula (2).

(Peak demand [kW])=(power consumption [kWh] for 30 minutes)×2　　(2)

FIG. 4 is a diagram for describing the peak-shaving effect. The horizontal axis of FIG. 4 represents time, while the vertical axis thereof represents the electric energy [kWh]. With reference to FIG. 4, the case of calculating the peak-shaving effect through simulation is described. As depicted in FIG. 4, a supply and demand status 4a represents the supply and demand status obtained by simulation in which the peak-shaving countermeasure is not carried out. Since the maximum power consumption for 30 minutes in the supply and demand status 4a is 157 kWh, a peak demand 4b is 157×2=314 kW. If the peak demand 4b can be successfully reduced to a peak demand 4c by operating the storage battery under the peak-shaving control, the supply and demand status 4a can be improved to a supply and demand status 4d. Since this peak demand 4c is 118×2=236 kW, a peak-shaving effect 4e is 314−236=78 kW. Note that the supply and demand status is expressed by the following formula (3).

(Supply and demand status [kWh])=(demand electric energy [kWh])+(the amount of photovoltaic power generation [kWh])−(the amount of discharge from storage battery [kWh] (or charged amount of storage battery))　　(3)

FIG. 5 is a diagram depicting one example of the optimal operation evaluation table. For example, the optimal operation evaluation table 116 stores a supply and demand scenario "1", an evaluation value "36" by the optimal operation plan, and an optimal control parameter "278" while associating these with each other. In other words, the optimal operation evaluation table 116 indicates that the best discharge reference value relative to the supply and demand scenario "1" is 278 kW and the peak-shaving effect in the case of operating the storage battery at this discharge reference value is 36 kW. As for the other supply and demand scenarios, the optimal operation evaluation table 116 similarly stores the supply and demand scenario, the evaluation value by the optimal operation plan, and the optimal control parameter while associating these with each other. The evaluation value by the optimal operation plan is an example of the first evaluation value. In the case of using the charged amount of the storage battery in the formula (3), the corresponding member of the formula is a positive member.

FIG. 6 is a diagram depicting an example of the initial operation plan table. The initial operation plan table 117 stores the initial operation plan and the control parameter while associating these with each other. Among these, "the initial operation plan" of the initial operation plan table 117 represents the identification information for identifying the candidate for the initial operation plan. "The control parameter" represents the control parameter of the initial operation plan. For example, the control parameter corresponds to the discharge reference value if the storage battery is operated by the peak-shaving method.

For example, the initial operation plan table 117 stores the initial operation plan "1" and a control parameter "50" while associating these with each other. In other words, the initial operation plan table 117 indicates that the discharge reference value of the initial operation plan "1" is 50 kW. As for other candidates for the initial operation plan, the initial operation plan table 117 similarly stores the initial operation plan and the control parameter while associating these with each other.

FIG. 7 is a diagram depicting an example of a corrected operation evaluation table. The corrected operation evaluation table 118 stores the initial operation plan, the supply and demand scenario, and the evaluation value of the optimal corrected operation plan relative to the initial operation plan while associating these with each other. Among these, "the initial operation plan" of the corrected operation evaluation table 118 represents the identification information for identifying the candidate for the initial operation plan. Moreover, "the supply and demand scenario" represents the identification information for identifying the supply and demand scenario. "The evaluation value of the optimal corrected operation plan relative to the initial operation plan P" represents the evaluation value for each supply and demand scenario in the case where the storage battery is operated according to the optimal corrected operation plan representing the optimal operation plan after the correction time relative to the corresponding initial operation plan.

For example, the corrected operation evaluation table 118 stores the initial operation plan "1", the supply and demand scenario "1", and the evaluation value "34" of the optimal corrected operation plan relative to the initial operation plan P, while associating these with each other. In other words, the corrected operation evaluation table 118 indicates that the evaluation value in the case where the storage battery is operated according to the initial operation plan "1" relative to the supply and demand scenario "1" and then operated according to the optimal corrected operation plan is "34". Moreover, the corrected operation evaluation table 118 stores other supply and demand scenarios for the initial operation plan "1" and other evaluation values of the optimal corrected operation plans relative to other initial operation plans while associating these with each other. Thus, the corrected operation evaluation table 118 stores a plurality of supply and demand scenarios and the evaluation values of the optimal corrected operation plans relative to a plurality of initial operation plans P with respect to one initial operation plan, while associating these with each other. As for the other initial operation plans, the corrected operation evaluation table 118 similarly stores the initial operation plan, the supply and demand scenario, and the evaluation value of the optimal corrected operation plan relative to the initial operation plan while associating these with each other. Note that the evaluation value of the optimal corrected operation plan relative to the initial operation plan is one example of a second evaluation value.

FIG. 8 is a diagram depicting an example of the flexibility evaluation table. The flexibility evaluation table 119 stores the initial operation plan, the supply and demand scenario, and the flexibility evaluation relative to the initial operation plan while associating these with each other. Among these, "the initial operation plan" of the flexibility evaluation table 119 represents the identification information for identifying the candidate for the initial operation plan. "The supply and demand scenario" represents the identification information for identifying the supply and demand scenario. "The flexibility evaluation relative to the initial operation plan" represents the regret value calculated for each supply and demand scenario on the corresponding initial operation plan. This regret value is the value evaluated from the viewpoint of how closer the evaluation value of the optimal corrected operation plan relative to each supply and demand scenario can get to the evaluation value of the optimal operation plan relative to each scenario, and as the regret value is smaller, the flexibility is higher.

For example, the flexibility evaluation table 119 stores the initial operation plan "1", the supply and demand scenario "1", and the flexibility evaluation "2" relative to the initial operation plan while associating these with each other. In other words, the flexibility evaluation table 119 indicates that the evaluation value of the flexibility is "2" in the case where the storage battery is operated according to the initial operation plan "1" relative to the supply and demand scenario "1". The flexibility evaluation table 119 stores other supply and demand scenarios and the flexibility evaluations relative to the other supply and demand scenarios with respect to the initial operation plan "1" while associating these with each other. In this manner, the flexibility evaluation table 119 stores a plurality of supply and demand scenarios and a plurality of flexibility evaluations relative to one initial operation plan while associating these with each other. As for other initial operation plans, the flexibility evaluation table 119 similarly stores the initial operation plan, the supply and demand scenario, and the flexibility evaluation relative to the initial operation plan while associating these with each other.

Now, back to the description of FIG. 1, the control unit 120 includes a reception unit 121, the supply and demand scenario generation unit 122, an optimal evaluation value calculation unit 123, a corrected evaluation value calculation unit 124, a flexibility calculation unit 125, an optimal plan selection unit 126, and the output unit 127.

The reception unit 121 receives various kinds of information from the input device 101. For example, the reception unit 121 receives the demand data 111*a* and the solar radiation quantity data 112 from the input device 101 and stores the received demand data 111*a* and solar radiation quantity data 112 in the storage unit 110.

Moreover, for example, the reception unit 121 receives the start time t0, the end time t_e, the initial sunshine-hours h0, and the time increment range Δt from the input device 101 as the condition of specifying the range of fluctuation of the solar radiation quantity to be considered in the preparation of the operation plan. Here, the start time t0 and the end time t_e correspond to the start time and the end time, respectively, in a time period in which the power generation output may fluctuate by a degree or more at which consideration is requested, i.e., in a time period in which sufficient power generation output would be expected if the weather were sunny. For example, the start time t0 is 9:00 and the end time t_e is 15:00. The initial sunshine hours h0 is calculated based on the solar radiation quantity at the start time t0 of a day as a target on which the initial operation plan is prepared, and for example based on the weather at the start time t0 predicted by the weather forecast of the previous day. For example, if the weather at the start time t0 is forecasted as "sunny", the initial sunshine hours h0 is "1". Although the reception unit 121 receives the initial sunshine hours h0 here, the present invention is not limited thereto. For example, the reception unit 121 may receive the initial solar radiation quantity. By converting the solar radiation quantity into the sunshine hours, the initial sunshine hours h0 is calculated. This conversion is performed based on the correlation between the solar radiation quantity and the sunshine hours for each month. Specifically, the solar radiation quantity and the sunshine hours are subjected to regression analysis and based on the formula of the regression line obtained, the sunshine hours is calculated. The time increment range Δt corresponds to the time interval of the sunshine hours recorded in the solar radiation quantity data 112. For example, the time increment range Δt is 1 hour. The reception unit 121 outputs the received start time t0, end time t_e, initial sunshine hours h0, and time increment range Δt to the supply and demand scenario generation unit 122.

The supply and demand scenario generation unit 122 generates a plurality of scenarios representing the possibility of the transition of the supply and demand power value. For example, the supply and demand scenario generation unit 122 constructs a weather change model in which the weather change per unit time is modeled as the Markov process based on the solar radiation quantity data 112. The supply and demand scenario generation unit 122 performs Monte Carlo simulation based on the constructed weather change model, thereby generating a plurality of output fluctuation scenarios O. Then, by the use of the difference between the plurality of output fluctuation scenarios O and the demand fluctuation scenario represented by the demand data 111a, the supply and demand scenario generation unit 122 generates the plurality of supply and demand scenarios. Here, the supply and demand scenario corresponds to the time-series data including as an element, the difference between the power demand in the power network in which the storage battery is operated and the output by the photovoltaic power generation. The supply and demand scenario generation unit 122 is one example of the generation unit. The supply and demand power value corresponds to the difference between the power demand in the power network in which the storage battery is operated and the output by the photovoltaic power generation and is also referred to as a supply and demand difference or a supply and demand balance. The supply and demand scenario is one example of the scenario.

The process executed by the supply and demand scenario generation unit 122 is hereinafter described specifically. For example, the supply and demand scenario generation unit 122 generates the sunshine hours transition probability table 113 based on the solar radiation quantity data 112. Specifically, on the premise that the sunshine hours at a certain time is influenced by the sunshine hours at the previous time, the supply and demand scenario generation unit 122 models the fluctuation of the sunshine hours per unit time as the Markov process. Here, the supply and demand scenario generation unit 122 can model the fluctuation of the sunshine hours as the Markov process because it is considered that the sunshine hours is influenced by clouds and the state such as the amount of clouds and the density of clouds continuously change over time. In other words, the sunshine hours measured at time intervals of such a degree that the continuous change of clouds can be captured is considered as being influenced by the weather at the previous time.

Figure 9:
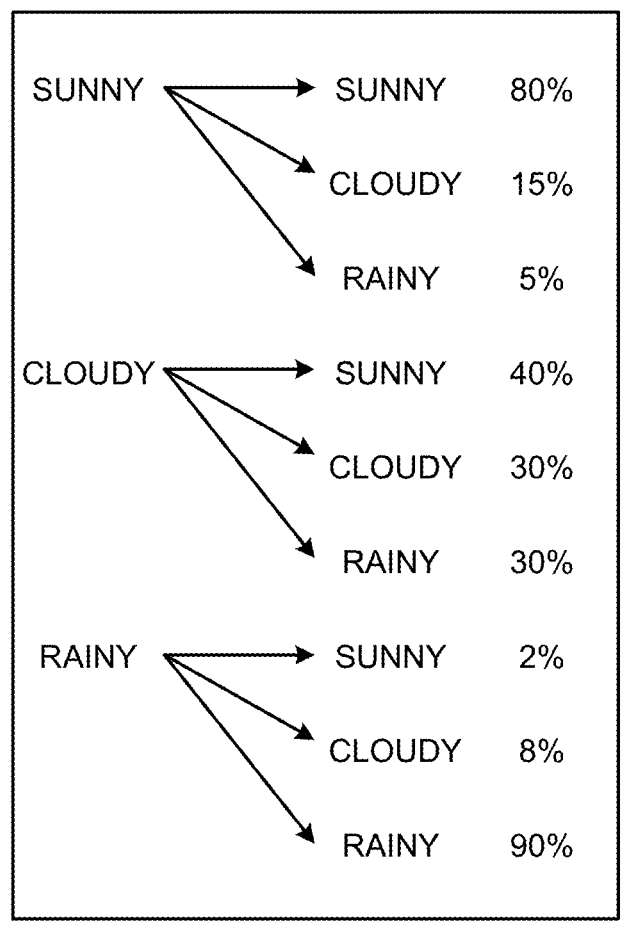
FIG. 9 is a diagram depicting a weather change model.

FIG. 9 is a diagram for describing the weather change model. For example, as depicted in FIG. 9, the supply and demand scenario generation unit 122 classifies the weather into sunny, cloudy, and rainy. Then, the supply and demand scenario generation unit 122 calculates the probability of weather change from the current weather to the weather in an hour (sunny, cloudy, and rainy) based on the past weather data, thereby generating the weather change model. The supply and demand scenario generation unit 122 outputs a plurality of scenarios representing the possibility of weather change of a day by repeatedly applying the weather change model every hour. Note that the weather change model illustrated in FIG. 9 is one example. More specifically, the supply and demand scenario generation unit 122 classifies the weather according to the sunshine hours, and models the change of sunshine hours after the respective sunshine hours.

For example, the supply and demand scenario generation unit 122 calculates the conditional probability $P(H_{after}|H_{before})$ where the sunshine hours change from the sunshine hours $H_{before}$ to the sunshine hours $H_{after}$ after a unit time using the following formula (4).

$$P(H_{after}|H_{before}) = (\text{number of pieces of data of } H_{after} \text{ appearing after } H_{before})/(\text{number of pieces of data of } H_{before}) \quad (4)$$

By calculating the conditional probability $P(H_{after}|H_{before})$ based on the past solar radiation quantity data 112 using the above formula, the supply and demand scenario generation unit 122 generates the sunshine hours transition probability table 113 of FIG. 3.

For example, the supply and demand scenario generation unit 122 generates a plurality of output fluctuation scenarios based on the generated sunshine hours transition probability table 113. Specifically, the supply and demand scenario generation unit 122 receives the start time t0, the end time t_e, the initial sunshine hours h0, and the time increment range Δt from the reception unit 121. The supply and demand scenario generation unit 122 generates probabilistically N patterns of solar radiation quantity fluctuation scenarios through Monte Carlo simulation by applying the sunshine hours transition probability table 113 for the unit of time relative to the start time t0 to the end time t_e with the initial sunshine hours h0 as the default value. Note that N is a sufficiently large natural number, such as 10000.

For example, the supply and demand scenario generation unit 122 generates uniform random numbers r, and the minimum x at which the integrated value of the conditional probability $P(x|H(t))$ of less than or equal to x is greater than r is $H(t+\Delta t)$. For example, if the sunshine hours $H(t)$ is "0.1", the supply and demand scenario generation unit 122 refers to the column in which the sunshine hours before the fluctuation of the sunshine hours transition probability table 113 illustrated in FIG. 3 is "0.1-0.5". If the generated random number is "r<0.45", the supply and demand scenario generation unit 122 acquires "$H(t+\Delta t)=0.0$"; if the random number is "0.45≤r<0.6", "$H(t+\Delta t)=0.1$" is acquired. In this manner, between the start time t0 and the end time t_e, the supply and demand scenario generation unit 122 acquires the sunshine hours $H(t+\Delta t)$ varying every time increment range Δt. Then, based on the correlation between the above sunshine hours and the solar radiation quantity, the supply and demand scenario generation unit 122 converts the acquired sunshine hours $H(t+\Delta t)$ into solar radiation quantity $I(t+\Delta t)$. The supply and demand scenario generation unit 122 generates a solar radiation quantity fluctuation scenario I from the fluctuation of the solar radiation quantity I(t) from the start time t0 to the end time t_e. By repeating the similar process, the supply and demand scenario generation unit 122 generates the N patterns of solar radiation quantity fluctuation scenarios I. Note that N is a sufficiently large natural number, such as 10000.

Figure 10:
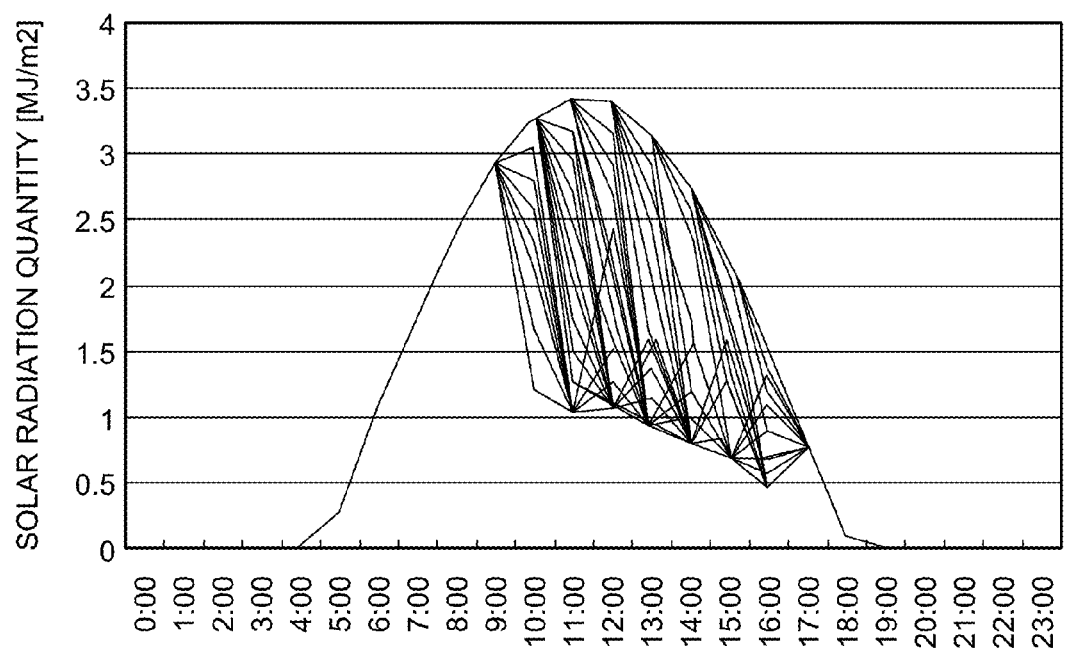
FIG. 10 is a diagram depicting an example of a solar radiation quantity fluctuation scenario.

FIG. 10 is a diagram depicting an example of the solar radiation quantity fluctuation scenario. The horizontal axis of FIG. 10 represents time while the vertical axis thereof represents the solar radiation quantity [$MJ/m^2$]. The time period from 9:00 to 16:00 in the solar radiation quantity fluctuation scenario I represents the solar radiation quantity fluctuation from 9:00 to 16:00, and there are N patterns of scenarios. In the time period from 0:00 to 9:00 and the time period from 16:00 to 24:00, the data are generated based on the past solar radiation quantity data 112, and there is one pattern of scenario.

For example, the supply and demand scenario generation unit 122 generates the output fluctuation scenario O for the photovoltaic power generation based on the generated solar radiation fluctuation scenario I. For example, the supply and demand scenario generation unit 122 converts the solar radiation quantity I(t) [$MJ/m^2$] included in the solar radiation quantity fluctuation scenario I into the amount of power generation O(t) [kWh] by the photovoltaic power generation. This conversion is performed by, for example, estimating the amount of power generation while associating the solar radiation quantity with the conversion efficiency that would change depending on the scale or kind of a panel, the ambient temperature, or the like. In this manner, the supply and demand scenario generation unit 122 generates the scenario from the start time t0 to the end time t_e by calculating the amount of power generation O(t) based on the solar radiation quantity I(t) included in the solar radiation quantity fluctuation scenario I. Moreover, the supply and demand scenario generation unit 122 generates the amount of power generation from 0:00 to the start time t0 and the scenario from the end time t_e to 24:00 by calculating the average value of the amount of power generation in each time period with reference to the past data on the amount of power generation by the photovoltaic power generation. The supply and demand scenario generation unit 122 generates the output fluctuation scenario O of a day by combining the scenario from the start time t0 to the end time t_e and the amount of power generation from 0:00 to the start time t0 and the scenario from the end time t_e to 24:00. Moreover, the supply and demand scenario generation unit 122 stores the generated output fluctuation scenario O as the output fluctuation data 114 in the storage unit 110. Here, the case of using the conversion efficiency has been described; however, the present invention is not limited thereto. For example, the correlation between the solar radiation quantity I(t) and the amount of power generation O(t) may be used alternatively. Specifically, the solar radiation quantity I(t) and the amount of power generation O(t) are subjected to regressive analysis and by substituting the solar radiation quantity I(t) in the formula of the obtained regression line, the amount of power generation O(t) is calculated.

For example, the supply and demand scenario generation unit 122 generates the plurality of supply and demand scenarios by the use of the difference between the plurality of output fluctuation scenarios O and the supply and demand fluctuation scenario depicted in FIG. 2. For example, the supply and demand scenario generation unit 122 generates the supply and demand scenario by subtracting from the demand power value of each time period in the supply and demand fluctuation scenario, the amount of power generation of the corresponding time period in the output fluctuation scenario O. In other words, this supply and demand scenario serves as the index of the demand electric energy relative to the storage battery.

Figure 11:
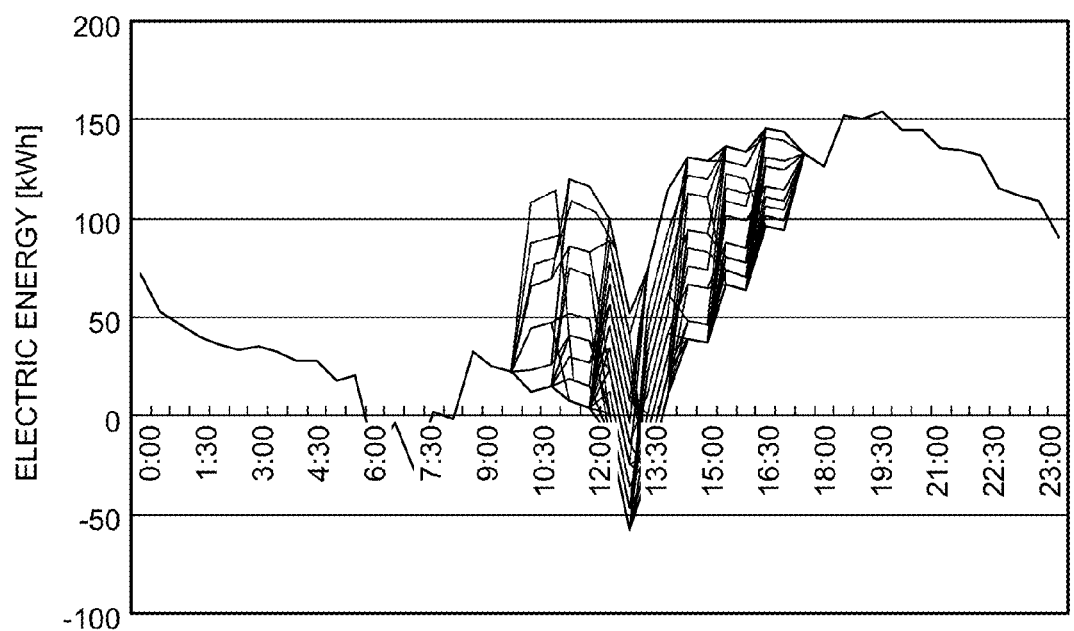
FIG. 11 is a diagram depicting an example of a supply and demand scenario.

FIG. 11 is a diagram depicting an example of the supply and demand scenario. The horizontal axis of FIG. 11 represents time while the vertical axis thereof represents the electric energy [kWh]. As this electric energy is larger, the demand is greater. As depicted in FIG. 11, the supply and demand scenario represents the transition of the demand electric energy for each time period of a day. For example, if M patterns of demand fluctuation scenarios and N patterns of output fluctuation scenarios are used, the supply and demand scenario generation unit 122 generates M×N patterns of supply and demand scenarios. The supply and demand scenario generation unit 122 stores the generated supply and demand scenarios in the storage unit 110 as the supply and demand data 115.

Back to the description of FIG. 1, the optimal evaluation value calculation unit 123 calculates the operation plan in which the evaluation value in the operation of the storage battery becomes the best evaluation value for every plural scenarios, and records the best evaluation value as the first evaluation value relative to each scenario. For example, the optimal evaluation value calculation unit 123 prepares the optimal operation plan as the operation plan in which the evaluation value by the simulation becomes the best relative to each of the supply and demand scenarios generated by the supply and demand scenario generation unit 122. Then, the optimal evaluation value calculation unit 123 stores the supply and demand scenario, the evaluation value by the optimal operation plan, and the optimal control parameter representing the best evaluation value in the optimal operation evaluation table 116 depicted in FIG. 5 while associating these with each other. Note that the optimal evaluation value calculation unit 123 is an example of a first calculation unit.

The optimal operation plan preparation process performed by the optimal evaluation value calculation unit 123 is hereinafter described specifically. Here, the case of operating the storage battery by the peak-shaving method is described. For example, the optimal evaluation value calculation unit 123 selects the supply and demand scenarios generated by the supply and demand scenario generation unit 122 one by one and performs the following process. The optimal evaluation value calculation unit 123 calculates the evaluation value by conducting the simulation while applying various discharge reference values to the selected supply and demand scenario. As the discharge reference values, for example, the discharge reference values included in the search range of the control parameter are applied in order by a predetermined increment. Then, the discharge reference value at which the evaluation value becomes the best is selected as the optimal operation plan. Here, the search range of the control parameter is described.

Figure 12:
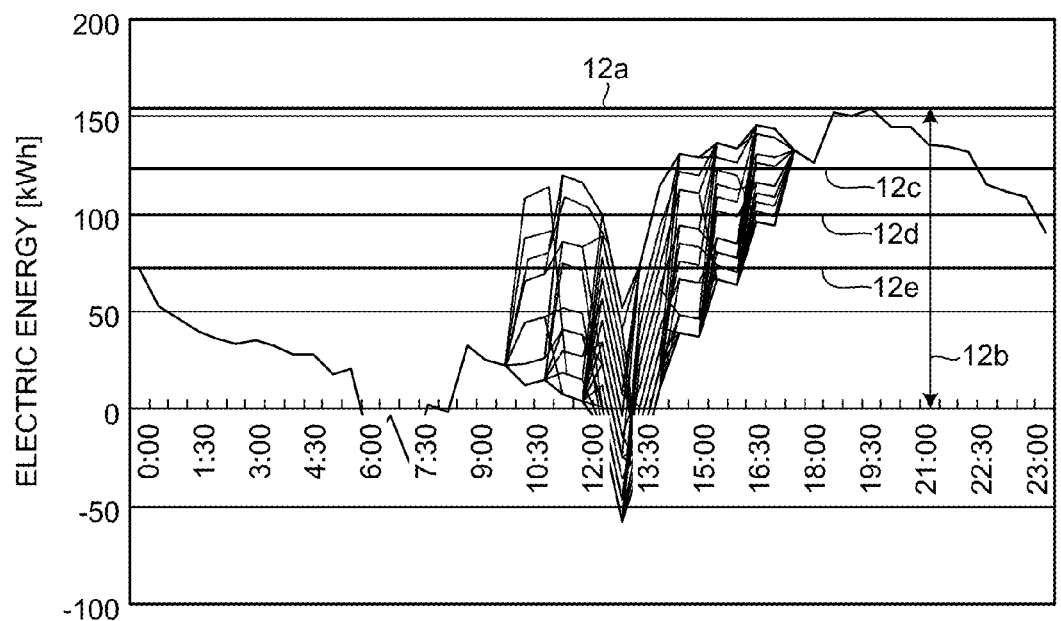
FIG. 12 is a diagram for describing the search range of a control parameter.

FIG. 12 is a diagram for describing the search range of the control parameter. The horizontal axis of FIG. 12 represents the time while the vertical axis thereof represents the electric energy [kWh]. FIG. 12 illustrates the search range of the control parameter relative to the supply and demand scenario depicted in FIG. 11. In the case of operating the storage battery by the peak-shaving method, the discharge reference value is the positive value not exceeding the maximum peak demand of the supply and demand scenario. Therefore, in the example illustrated in FIG. 12, the optimal evaluation value calculation unit 123 uses the range from a maximum peak demand 12a to the power value 0 kW as a search range 12b. In other words, the optimal evaluation value calculation unit 123 selects any power value as the discharge reference value from the search range 12b, and uses the selected discharge reference value for the simulation. For example, a discharge reference value 12c is 125 kW, a discharge reference value 12d is 100 kW, and a discharge reference value 12e is 75 kW.

For example, the optimal evaluation value calculation unit 123 selects the highest discharge reference value, 157 kW, from among the discharge reference values included in the search range 12b, and performs the simulation in the case where the storage battery is operated at the selected discharge reference vale 157 kW. The optimal evaluation value calculation unit 123 selects a value smaller by 1 kW as the next discharge reference value, and performs the similar simulation; this process is repeated until the bottom of the search range 12b. The optimal evaluation value calculation unit 123 selects the discharge reference value representing the best peak-shaving effect from among the discharge reference values obtained in the simulation, as the optimal operation plan. Then, the optimal evaluation value calculation unit 123 stores the supply and demand scenario, the best peak-shaving effect, and the discharge reference value representing the best peak-shaving effect in the optimal operation evaluation table 116 while associating these with each other. The best peak-shaving effect corresponds to the evaluation value by the optimal operation plan, and the discharge reference value representing the best peak-shaving effect corresponds to the optimal control parameter. The optimal evaluation value calculation unit 123 executes the similar process on the other supply and demand scenarios, thereby generating the optimal operation evaluation table 116. Note that the search process for the optimal operation plan executed by the optimal evaluation value calculation unit 123 is not limited to the above method. For example, the discharge reference value may be selected at 1 kW intervals in the order from the lowest discharge reference value 0 kW among the discharge reference values included in the search range 12b. Alternatively, for example, the discharge reference value may be selected at 5 kW intervals. Further alternatively, the optimal plan may be searched using Particle Swarm Optimization or an optimizing algorithm such as genetic algorithm.

The corrected evaluation value calculation unit 124 prepares a plurality of operation plan candidates, and calculates a second evaluation value obtained when the storage battery is operated till the plan correction time according to the operation plan candidate relative to each scenario. For example, the corrected evaluation value calculation unit 124 prepares a plurality of candidates for the initial operation plan. Then, the corrected evaluation value calculation unit 124 calculates for each supply and demand scenario, the evaluation value in the case of operating the storage battery according to the prepared initial operation plan till the correction time and then operating the storage battery according to the optimal corrected operation plan representing the optimal operation plan after the correction time in accordance with the subsequent condition (the amount of power left in the storage battery). Note that the corrected evaluation value calculation unit 124 is an example of a second calculation unit.

The process executed by the corrected evaluation value calculation unit 124 is hereinafter described specifically. First, the corrected evaluation value calculation unit 124 prepares the candidates for the initial operation plan. For example, the corrected evaluation value calculation unit 124 prepares the candidates for the initial operation plan in the range from the minimum to maximum values of the optimal control parameters of the optimal operation evaluation table 116 illustrated in FIG. 5. This is because, if the storage battery is operated by the peak-shaving method, the peak-shaving effect relative to each supply and demand scenario is reduced as the discharge reference value is deviated from the optimal discharge reference value relative to the supply and demand scenario and the peak-shaving effect becomes 0 when the discharge reference value is deviated therefrom by a certain level or more. For example, the corrected evaluation value calculation unit 124 prepares the discharge reference value from 50 kW to 150 kW at 10 kW intervals as the candidate for the initial operation plan. Then, the corrected evaluation value calculation unit 124 stores the initial operation plan and the control parameter in the initial operation plan table 117 illustrated in FIG. 6 while associating these with each other. Note that the candidates for the initial operation plan correspond to the initial operation plan and the discharge reference value corresponds to the control parameter. A method of preparing the candidates for the initial operation plan is not limited to the above method. For example, the corrected evaluation value calculation unit 124 may prepare the candidate arbitrarily in the search range 12b illustrated in FIG. 12.

Next, the corrected evaluation value calculation unit 124 prepares the optimal corrected operation plan on each of the candidates for the initial operation plan. For example, the corrected evaluation value calculation unit 124 performs the simulation on the case of operating the storage battery according to the candidate for the initial operation plan relative to each supply and demand scenario. The corrected evaluation value calculation unit 124 calculates the amount of power left in the storage battery in the case of operating the storage battery till the correction time based on the simulation result. Then, assuming that the calculated amount of power left in the storage battery as the default remaining amount, the optimal operation plan in which the evaluation value becomes the best in the case of operating the battery from the correction time to the operation end time is prepared; then, the operation plan is recorded as the optimal corrected operation plan relative to the combination of the initial operation plan candidate and the scenario. This optimal corrected operation plan preparation process is performed according to the procedure similar to that of the optimal operation plan preparing process performed by the optimal evaluation value calculation unit 123.

Next, the corrected evaluation value calculation unit 124 calculates the evaluation value in the case of operating the storage battery according to the initial operation plan candidate till the correction time and then according to the optimal corrected operation plan after the correction time, and stores the obtained evaluation value in the corrected operation evaluation table 118 illustrated in FIG. 7 as the second evaluation value relative to the combination of the initial operation plan candidate and each scenario. The corrected evaluation value calculation unit 124 similarly performs the process on the other initial operation plans. Alternatively, the optimal plan may be searched using Particle Swarm Optimization or an optimizing algorithm such as genetic algorithm.

The flexibility calculation unit 125 calculates the difference between the first evaluation value and the second evaluation value in each scenario for every plural operation plan candidates. For example, the flexibility calculation unit 125 evaluates the flexibility by calculating the difference between the evaluation value by the optimal operation plan illustrated in the optimal operation evaluation table 116 of FIG. 5 and the evaluation value of the optimal corrected operation plan relative to the initial operation plan P illustrated in the corrected operation evaluation table 118 of FIG. 7. In other words, the flexibility calculation unit 125 evaluates the flexibility from the viewpoint that how closer the evaluation value of the optimal corrected operation plan relative to each supply and demand scenario can get to the evaluation value by the optimal operation plan relative to each scenario. Note that the flexibility calculation unit 125 is one example of a third calculation unit.

For example, the flexibility calculation unit 125 calculates the regret value using the following formula (5). For example, the flexibility calculation unit 125 evaluates that the flexibility is higher as the regret value is smaller.

$$(\text{Regret value}) = (\text{evaluation value by optimal operation plan}) - (\text{evaluation value of optimal corrected operation plan relative to initial operation plan}) \quad (5)$$

For example, the flexibility calculation unit 125 stores the initial operation plan, the supply and demand scenario, and the flexibility evaluation relative to the initial operation plan in the flexibility evaluation table 119 illustrated in FIG. 8 while associating these with each other. Note that the regret value corresponds to the flexibility evaluation relative to the initial operation plan. The flexibility calculation unit 125 performs the similar process on the other initial operation plans.

The optimal plan selection unit 126 selects the operation plan of the storage battery from the plural operation plans based on the difference between the first evaluation value and the second evaluation value. For example, the optimal plan selection unit 126 accumulates the distribution of the regret values for each candidate for the initial operation plan, and selects the initial operation plan based on the accumulated distribution of the regret values. Note that the optimal plan selection unit 126 is an example of a selection unit.

Figure 13:
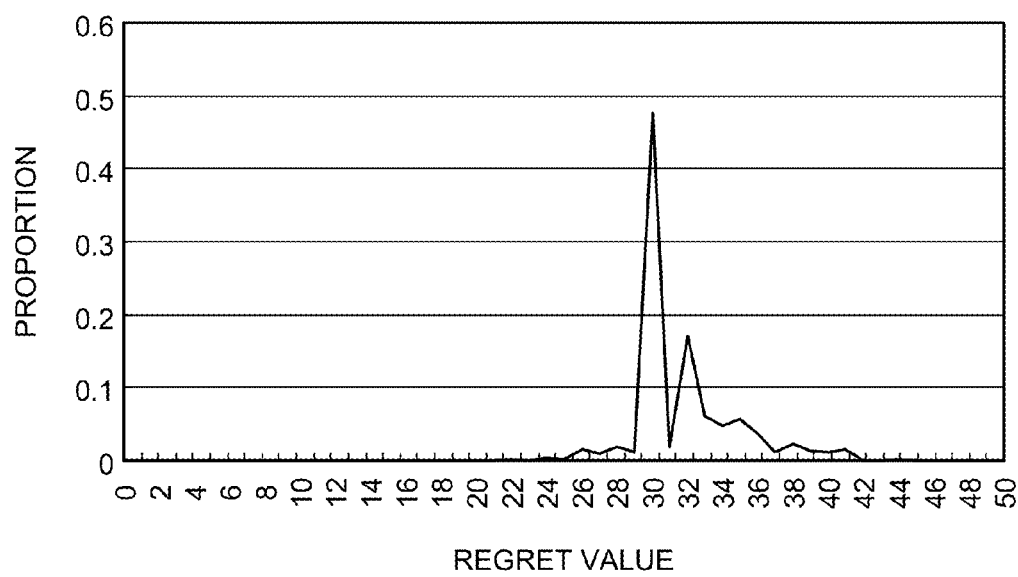
FIG. 13 is a diagram depicting an example of the distribution of regret values.
Figure 14:
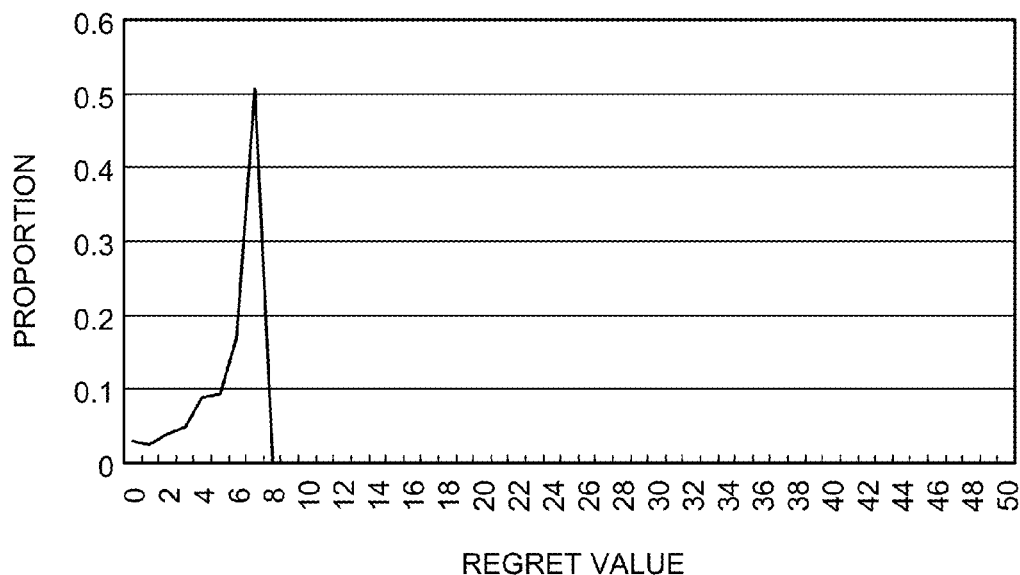
FIG. 14 is a diagram depicting an example of the distribution of regret values.
Figure 15:
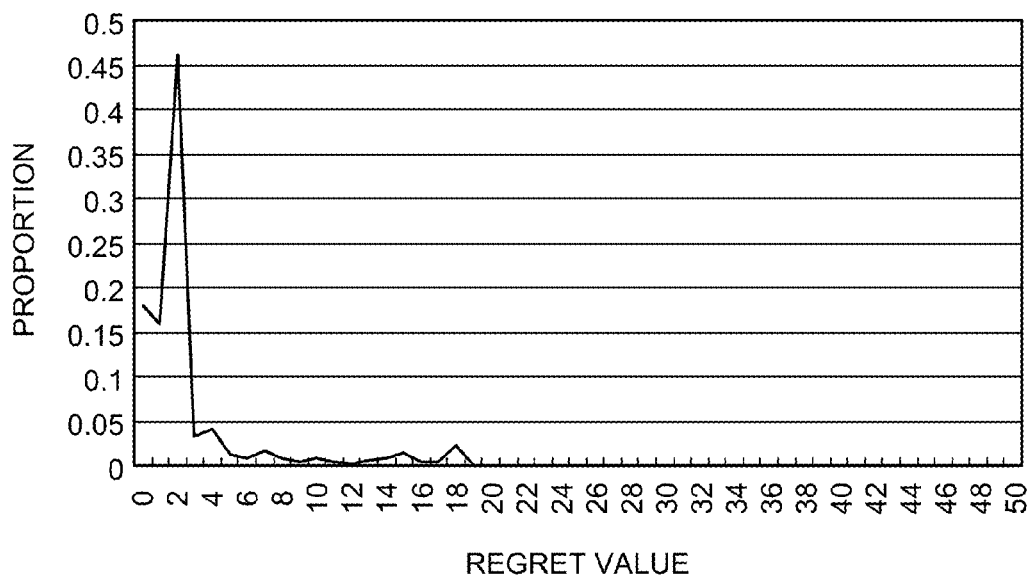
FIG. 15 is a diagram depicting an example of the distribution of regret values.

FIGS. 13 to 15 are diagrams each depicting an example of the distribution of the regret values. In each of FIGS. 13 to 15, the horizontal axis represents the regret value while the vertical axis represents the proportion of the supply and demand scenario corresponding to the regret value. FIG. 13 illustrates the example of the distribution of the regret values in the initial operation plan A. As illustrated in FIG. 13, in the initial operation plan A, the best regret value is 21 and the worst regret value is 42. FIG. 14 illustrates the example of the distribution of the regret values in the initial operation plan B. As illustrated in FIG. 14, in the initial operation plan B, the best regret value is 0 and the worst regret value is 7. FIG. 15 illustrates the example of the distribution of the regret values in the initial operation plan C. As illustrated in FIG. 15, in the initial operation plan C, the best regret value is 0 and the worst regret value is 19.

Here, the description is made of the case of comparing the initial operation plan A illustrated in FIG. 13 and the initial operation plan B illustrated in FIG. 14 based on the Wald decision criterion. The Wald decision criterion is the criterion for selecting the operation plan in which the evaluation value (worst evaluation value) is the best in the worst scenario for each operation plan. In the initial operation plan A, the best regret value is 21; meanwhile, in the initial operation plan B, the regret value is 7 at worst. Therefore, the initial operation plan B is the operation plan with high flexibility in which the effect close to the optimal effect can be expected as compared with the initial operation plan A under any supply and demand scenario. Therefore, based on the Wald decision criterion, the optimal plan selection unit 126 selects the initial operation plan B. In the case of selecting the regret value based on the Wald decision criterion as above, the criterion is referred to as the criterion of Savage or minimax loss criterion.

Further, the description is made of the case of comparing the initial operation plan B illustrated in FIG. 14 and the initial operation plan C illustrated in FIG. 15 based on the Wald decision criterion. Though the average regret value of the initial operation plan C is lower than the average regret value of the initial operation plan B, the initial operation plan C contains a small number of supply and demand scenarios which have a higher regret value. In other words, the effect close to the effect of the optimal operation plan can be expected in the supply and demand scenario with high probability in the initial operation plan C as compared with the initial operation plan B; however, it can be said that the initial operation plan C is the operation plan that could cause large loss rarely. Therefore, under any supply and demand scenario, the initial operation plan B is the operation plan with high flexibility in which the effect close to the optimal effect can be expected as compared with the initial operation plan C. Therefore, the optimal plan selection unit 126 selects the initial operation plan B if the comparison is made based on the Wald decision criterion. Note that the criterion based on which the optimal plan selection unit 126 selects the initial operation plan is not limited to the Wald decision criterion. For example, the optimal plan selection unit 126 may select the initial operation plan based on the criterion that the plan with the best average regret value is selected. In this case, the optimal plan selection unit 126 selects the initial operation plan C with a lower average regret value than the initial operation plan B. For example, the optimal plan selection unit 126 may select the initial operation plan based on the criterion that the plan with the minimal dispersion of the regret values is selected. In this case, the optimal plan selection unit 126 calculates the dispersion of the regret values of the initial operation plans B and C, and compares the dispersion of the calculated regret values. Here, if the dispersion of the regret values of the initial operation plan B is the minimum, the optimal plan selection unit 126 selects the initial operation plan B. Moreover, for example, the optimal plan selection unit 126 may use the aforementioned selection criteria in combination. For example, the optimal plan selection unit 126 may select the initial operation plan in which the worst regret value is less than a predetermined value and the average regret value is greater than a predetermined value.

The output unit 127 outputs various kinds of information to the output device 102. For example, the output unit 127 outputs the best initial operation plan selected by the optimal plan selection unit 126 to the output device 102. Note that the information output from the output unit 127 is not limited to the best initial operation plan only. For example, the output unit 127 outputs the supply and demand scenario in addition to the initial operation plan selected by the optimal plan selection unit 126.

Figure 16:
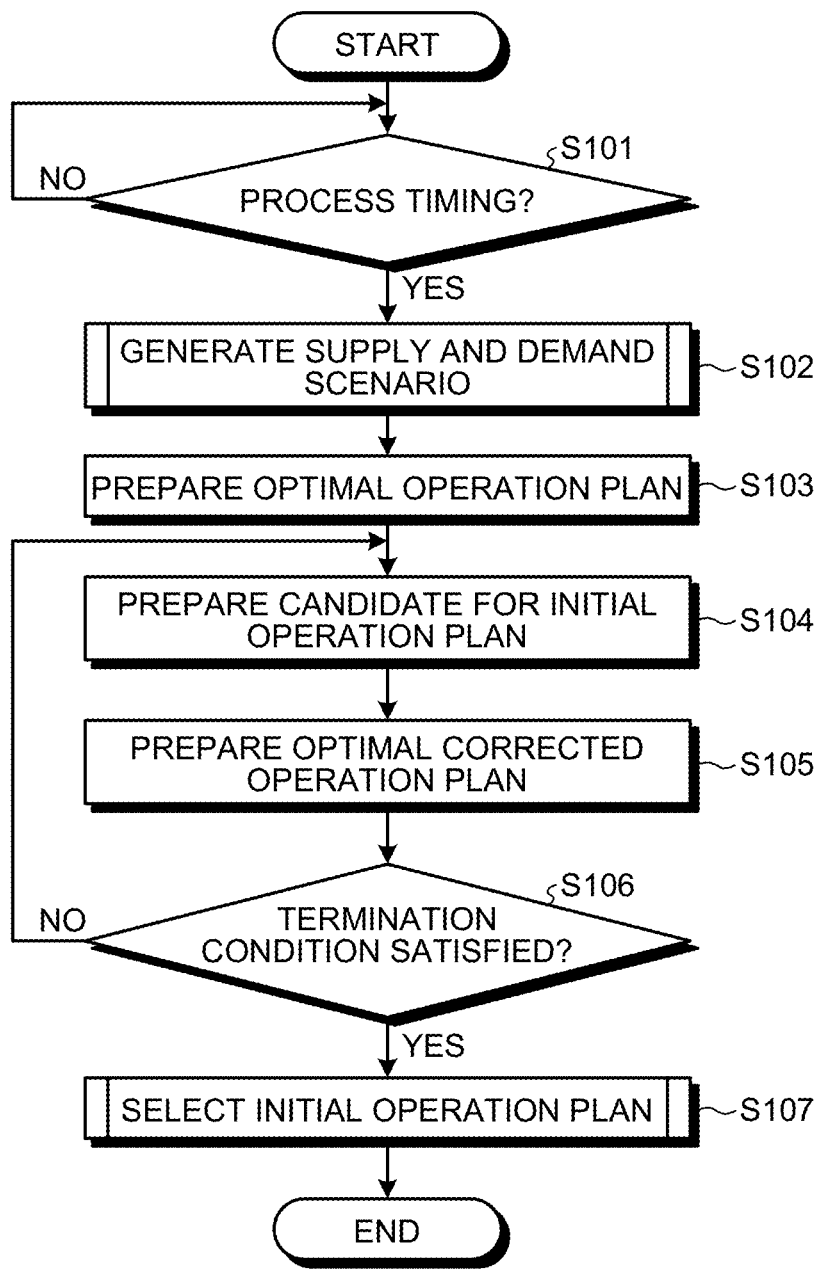
FIG. 16 is a flowchart depicting a process procedure of an operation plan preparation device.

Next, the process procedure of the operation plan preparation device 100 according to Embodiment 1 is described. FIG. 16 is a flowchart of the process procedure of the operation plan preparation device. The process illustrated in FIG. 16 is triggered by the reception of the start time t0, the end time t_e, the initial sunshine hours h0, and the time increment range Δt in the reception unit 121, for example.

As illustrated in FIG. 16, the supply and demand scenario generation unit 122 generates the plural supply and demand scenarios (Step S102).

Figure 17:
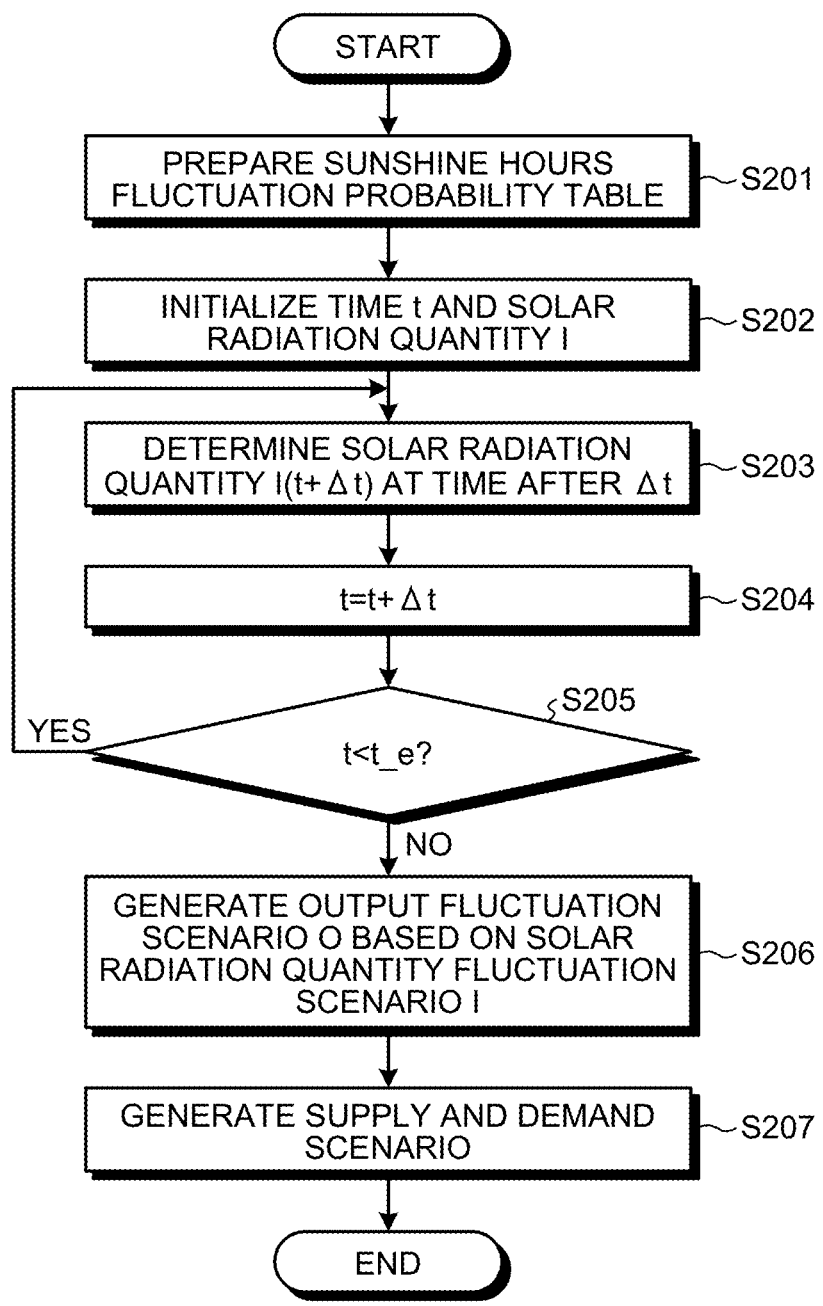
FIG. 17 is a flowchart depicting a process procedure of generating a supply and demand scenario.

Here, with reference to FIG. 17, the process procedure for generating the supply and demand scenarios illustrated in Step S102 of FIG. 16 is described. FIG. 17 is a flowchart of the process procedure of the supply and demand scenario generation process.

As illustrated in FIG. 17, the supply and demand scenario generation unit 122 generates the sunshine hours transition probability table 113 from the solar radiation quantity data 112 (Step S201). The supply and demand scenario generation unit 122 initializes the time t and the solar radiation quantity I (Step S202). In other words, the supply and demand scenario generation unit 122 sets time t=t0 and the solar radiation quantity I(t)=h0.

The supply and demand scenario generation unit 122 determines the solar radiation quantity I(t+Δt) at the time after the time increment range Δt (Step S203). The supply and demand scenario generation unit 122 acquires the sunshine hours H(t+Δt) at the time after the time increment range Δt while the initial sunshine hours h0 is set as the default value. The supply and demand scenario generation unit 122 converts the acquired sunshine hours H(t+Δt) into I(t+Δt) using the aforementioned correlation between the sunshine hours and the solar radiation quantity.

The supply and demand scenario generation unit 122 adds the time increment range Δt to the current time t (Step S204). The supply and demand scenario generation unit 122 compares the time t and the end time t_e and determines whether t<t_e or not (Step S205). If t<t_e (YES in Step S205), the supply and demand scenario generation unit 122 returns to the process of Step S203. The supply and demand scenario generation unit 122 repeats the process from Step S203 to Step S205 until the solar radiation quantity fluctuation scenario I is generated.

Meanwhile, if t<t_e is not satisfied (NO in Step S205), the supply and demand scenario generation unit 122 generates the output fluctuation scenario O based on the solar radiation quantity fluctuation scenario I (Step S206). Note that the supply and demand scenario generation unit 122 repeats the process from Step S202 to Step S206 until the N patterns of output fluctuation scenarios O are generated. Then, the supply and demand scenario generation unit 122 generates M×N patterns of the supply and demand scenarios by using the difference between the N patterns of the output fluctuation scenarios O and the M patterns of the demand fluctuation scenarios (Step S207).

Back to the description of FIG. 16, the optimal evaluation value calculation unit 123 prepares the optimal operation plan in which the evaluation value by the simulation is the best relative to each of the supply and demand scenarios generated by the supply and demand scenario generation unit 122 (Step S103). Then, the optimal evaluation value calculation unit 123 stores the supply and demand scenario, the evaluation value by the optimal operation plan, and the optimal control parameter representing the best evaluation value in the optimal operation evaluation table 116 while associating these with each other.

The corrected evaluation value calculation unit 124 prepares the candidates for the initial operation plan (Step S104). The corrected evaluation value calculation unit 124 prepares the optimal corrected operation plan representing the optimal operation plan after the correction time for the prepared candidates for the initial operation plan (Step S105). Then, for each supply and demand scenario, the corrected evaluation value calculation unit 124 calculates the evaluation value in the case of operating the storage battery according to the optimal corrected operation plan.

The corrected evaluation value calculation unit 124 returns to the process of Step S104 if the termination condition is not satisfied (NO in Step S106). For example, the corrected evaluation value calculation unit 124 returns to the process of Step S104 if the process is not finished on all the prepared candidates for the initial operation plan. For example, the corrected evaluation value calculation unit 124 returns to the process of Step S104 if a strong candidate for the initial operation plan to be evaluated next is estimated based on the combination between the supply and demand scenario and the candidate for the initial operation plan whose evaluation value is calculated.

Meanwhile, if the termination condition is satisfied (YES in Step S106), the optimal plan selection unit 126 selects the initial operation plan (Step S107).

Figure 18:
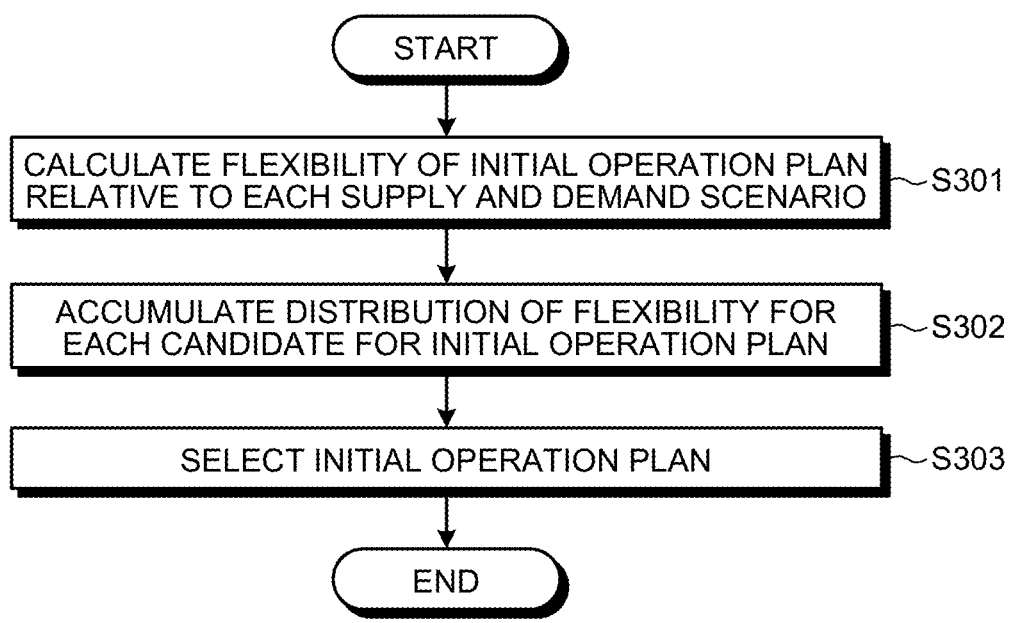
FIG. 18 is a flowchart depicting a process procedure of a selection process of the initial operation plan.

Here, with reference to FIG. 18, the process procedure of the selection process of the initial operation plan illustrated in Step S107 of FIG. 16 is described. FIG. 18 is a flowchart of the process procedure of the selection process of the initial operation plan.

As depicted in FIG. 18, the flexibility calculation unit 125 calculates the flexibility of the initial operation plan relative to each supply and demand scenario (Step S301). In other words, the flexibility calculation unit 125 evaluates the flexibility by calculating the difference between the evaluation value by the optimal operation plan recorded in the optimal operation evaluation table 116 and the evaluation value of the optimal corrected operation plan relative to the initial operation plan P recorded in the corrected operation evaluation table 118.

The optimal plan selection unit 126 accumulates the distribution of the flexibility for each candidate for the initial operation plan (Step S302). Then, based on the accumulated distribution of the flexibility, the optimal plan selection unit 126 selects the initial operation plan (Step S303).

Next, the effect of the operation plan preparation device 100 according to Embodiment 1 is described. The operation plan preparation device 100 prepares a plurality of scenarios representing the possibility of the transition of the supply and demand power value. The operation plan preparation device 100 calculates, for each scenario, the operation plan in which the first evaluation value as the best evaluation value in the operation of the storage battery is obtained. For every plural candidates for the operation plan, the operation plan preparation device 100 calculates the second evaluation value obtained in the operation of the storage battery according to that plan relative to each scenario. For every plural candidates for the operation plan, the operation plan preparation device 100 calculates the difference between the first evaluation value and the second evaluation value on each scenario. The operation plan preparation device 100 selects the operation plan of the storage battery from the plural operation plans based on the difference. For this reason, the operation plan preparation device 100 can prepare the operation plan that can flexibly deal with any weather change. In other words, the plural scenarios representing the possibility of the transition of the supply and demand power value that could occur due to the weather change are used and the initial operation plan candidates are evaluated based on the first evaluation value as the best evaluation value relative to each scenario. Therefore, by correcting the operation plan as appropriate after the operation according to that initial operation plan till the correction time, the initial operation plan which is flexible enough to provide the effect close to the effect of the operation according to the optimal operation plan relative to that scenario from the beginning can be obtained no matter which scenario is realized.

Moreover, the operation plan preparation device 100 generates the supply and demand scenario by modeling with the inclusion in the power generation output fluctuation scenario in accordance with the fluctuation probability in the past weather data even under the circumstance in which the output of the photovoltaic power generation largely fluctuates. Therefore, the operation plan preparation device 100 can evaluate the operation plan in consideration of the possibility of sudden change of the output of the photovoltaic power generation and select the operation plan with high evaluation.

In other words, for example, in the case of operating the storage battery by the peak-shaving method, if the amount of power left in the storage battery is small, it has conventionally been impossible to deal with the decrease in output which is relatively small amount and for a short time, and a large loss may be generated. In contrast, the operation plan preparation device 100 can evaluate the operation plan in consideration of the effect of the decrease in output which is such a small scale; therefore, the operation plan with high flexibility that is less affected by the output fluctuation of the photovoltaic power generation can be selected.

For example, the operation plan preparation device 100 outputs the supply and demand scenario together with the selected initial operation plan. Specifically, the operation plan preparation device 100 extracts the supply and demand scenario included in the predetermined proportion from the higher regret value out of the selected initial operation plan, and outputs the extracted supply and demand scenario. Therefore, the operation plan preparation device 100 can support the specific examination of the possibility of avoiding the loss, for example, the improvement of the control method for the storage battery and the introduction of a preliminary power generation facility for supplying the shortage of the power left in the storage battery.

Moreover, for example, the operation plan preparation device 100 extracts the supply and demand scenario included in the predetermined proportion from the higher regret value out of the selected initial operation plan, and outputs the extracted supply and demand scenario. The operation plan preparation device 100 calculates the expected amount of power left in the battery, which represents the amount of power left in the battery in the case of operating the storage battery according to the selected initial operation plan till the correction time on the extracted supply and demand scenario. The operation plan preparation device 100 calculates the ideal amount of power left in the battery, which represents the amount of power left in the battery in the case of operating the storage battery according to the best operation plan till the correction time on the extracted supply and demand scenario. Here, the difference between the expected amount of power left in battery and the ideal amount of power left in battery corresponds to the total amount of electric energy to be supplied for avoiding the loss. Therefore, the operation plan preparation device 100 can estimate the scale of the preliminary power generation facility for which the introduction effect can be expected.

Embodiment 2

The embodiments of the present invention have been described so far; moreover, the present invention may be implemented based on other embodiments than the above embodiment. Now, the other embodiments are hereinafter described.

For example, the above embodiment has described the case of evaluating the operation plan using the peak-shaving effect; however, the present invention is not limited thereto. For example, the operation plan may be evaluated using the environmental load reduction effect or the cost reduction effect.

Here, the environmental load reduction effect is described. The environmental load reduction effect is for evaluating how much $CO_2$ can be reduced by the use of photovoltaic power generation or a storage battery. For example, the environmental load reduction effect is expressed by the following formula (6).

(Environmental load reduction effect)=($CO_2$ conversion coefficient relative to daytime power generation)×(reduction amount of daytime power consumption)−($CO_2$ conversion coefficient relative to nighttime power generation)×(nighttime power consumption)     (6)

The $CO_2$ conversion coefficient relative to the daytime power generation is, for example, 0.462 [kg–$CO_2$/kWh] and the $CO_2$ conversion coefficient relative to the nighttime power generation is, for example, 0.435 [kg–$CO_2$/kWh]. This is based on Reference Literature ""Introduction of seasonally averaged emission coefficient" (March 27, Heisei 21) of the secretariat of review committee for a calculation method, etc. of the emission coefficient for each business entity based on Global Warming Prevention Law." The conversion coefficient herein described is just one example, and any value can be used alternatively. In the description below, the optimal operation evaluation table 116, the corrected operation evaluation table 118, and the flexibility evaluation table 119 in the case of using the environmental load reduction effect are used.

FIG. 19 is a diagram depicting an example of the optimal operation evaluation table in the case of using the environmental load reduction effect. For example, the optimal operation evaluation table 116 stores the supply and demand scenario "1", the evaluation value "17" by the optimal operation plan, and the optimal control parameter "278" while associating these with each other. In other words, in the optimal operation evaluation table 116, the best discharge reference value relative to the supply and demand scenario "1" is 278 kW, and the environmental load reduction effect in the case of operating the storage battery under this discharge reference value is 17 kg–$CO_2$. Moreover, as for the other supply and demand scenarios, the optimal operation evaluation table 116 also stores the supply and demand scenario, the evaluation value by the optimal operation plan, and the optimal control parameter while associating these with each other.

FIG. 20 is a diagram depicting an example of the corrected operation evaluation table in the case of using the environmental load reduction effect. For example, the corrected operation evaluation table 118 stores the initial operation plan "1", the supply and demand scenario "1", and the evaluation value "16" of the optimal corrected operation plan relative to the initial operation plan P while associating these with each other. In other words, in the corrected operation evaluation table 118, the environmental load reduction effect in the case of operating the storage battery according to the optimal corrected operation plan after operating the storage battery according to the initial operation plan "1" relative to the supply and demand scenario "1" is 16 kg–$CO_2$. Moreover, the corrected operation evaluation table 118 stores the other supply and demand scenario and the evaluation value of the optimal corrected operation plan relative to the other initial operation plan P on the initial operation plan "1" while associating these with each other. Thus, the corrected operation evaluation table 118 stores the plural supply and demand scenarios and the evaluation values of the optimal corrected operation plans relative to the plural initial operation plans P on one initial operation plan, while associating these with each other. As for the other operation plans, the corrected operation evaluation table 118 similarly stores the initial operation plan, the supply and demand scenario, and the evaluation value of the optimal corrected operation plan relative to the initial operation plan P while associating these with each other.

FIG. 21 is a diagram depicting an example of the flexibility evaluation table. For example, the flexibility evaluation table 119 stores the initial operation plan "1", the supply and demand scenario "1", and the flexibility evaluation "1" relative to the initial operation plan P while associating these with each other. In other words, in the flexibility evaluation table 119, the deviation from the ideal value of the environmental load reduction effect in the case of operating the storage battery according to the initial operation plan "1" relative to the supply and demand scenario "1" is 1 kg–$CO_2$. Moreover, the flexibility evaluation table 119 stores the other supply and demand scenario and the flexibility evaluation relative to the other initial operation plan P on the initial operation plan "1" while associating these with each other. In this manner, the flexibility evaluation table 119 stores the plural supply and demand scenarios and the flexibility evaluation relative to the plural initial operation plans P with respect to one initial operation plan. Then, as for the other initial operation plans, the flexibility evaluation table 119 similarly stores the initial operation plan, the supply and demand scenario, and the flexibility evaluation relative to the initial operation plan P while associating these with each other.

In this manner, even when the environmental load reduction effect is employed, the operation plan preparation device 100 also stores the supply and demand scenario, the evaluation value by the optimal operation plan, and the optimal control parameter representing the best evaluation value in the optimal operation evaluation table 116 illustrated in FIG. 19 while associating these with each other. Moreover, the operation plan preparation device 100 stores the initial operation plan, the supply and demand scenario, and the evaluation value of the optimal corrected operation plan relative to the initial operation plan P in the corrected operation evaluation table 118 illustrated in FIG. 20 while associating these with each other. Moreover, the operation plan preparation device 100 evaluates the flexibility by calculating the difference between the evaluation value by the optimal operation plan illustrated in the optimal operation evaluation table 116 of FIG. 19 and the evaluation value of the optimal corrected operation plan relative to the initial operation plan P illustrated in the corrected operation evaluation table 118 of FIG. 20. Therefore, the operation plan preparation device 100 can prepare the operation plan in which the effect close to the best environmental load reduction effect can be obtained under any weather change.

Moreover, the cost reduction effect is described. The cost reduction effect is for evaluation by converting how much the cost can be reduced by the use of the photovoltaic power generation or the storage battery into money. For example, the cost reduction effect is expressed by the following formula (7).

$$\begin{aligned}\text{(Cost reduction effect)}=&\text{(electric charge per 1 kWh)}\times\\&\{\text{(power consumption before countermeasure)}-\\&\text{(power consumption after countermeasure)}\}+\{\\&\text{(basic charge before countermeasure)}-\text{(basic}\\&\text{charge after countermeasure)}\}\end{aligned}\quad(7)$$

Note that the basic charge is the charge calculated by the maximal peak demand and is, for example, the charge set by each power company. The optimal operation evaluation table 116, the corrected operation evaluation table 118, and the flexibility evaluation table 119 in the case of using the cost reduction effect are exemplified below.

FIG. 22 is a diagram depicting an example of the optimal operation evaluation table in the case of using the cost reduction effect. For example, in the optimal operation evaluation table 116, the supply and demand scenario "1", the evaluation value "36" by the optimal operation plan, and the optimal control parameter "278" are stored while being associated with each other. In other words, in the optimal operation evaluation table 116, the best discharge reference value relative to the supply and demand scenario "1" is 278 kW and the cost reduction effect in the case of operating the storage battery under this discharge reference value is 36,000,000 yen. Moreover, as for the other supply and demand scenarios, the optimal operation evaluation table 116 similarly stores the supply and demand scenario, the evaluation value by the optimal operation plan, and the optimal control parameter while associating these with each other.

FIG. 23 is a diagram depicting an example of the corrected operation evaluation table in the case of using the cost reduction effect. For example, in the corrected operation evaluation table 118, the initial operation plan "1", the supply and demand scenario "1", and the evaluation value "34" of the optimal corrected operation plan relative to the initial operation plan P are stored while being associated with each other. In other words, in the corrected operation evaluation table 118, the cost reduction effect in the case of operating the storage battery according to the optimal corrected operation plan after operating the storage battery according to the initial operation plan "1" relative to the supply and demand scenario "1" is 34,000,000 yen. Moreover, as for the initial operation plan "1", the corrected operation evaluation table 118 stores the other supply and demand scenario and the evaluation value of the optimal corrected operation plan relative to the other initial operation plan P while associating these with each other. In this manner, the corrected operation evaluation table 118 stores the plural supply and demand scenarios and the evaluation values of the optimal corrected operation plans relative to the plural initial operation plans P for one initial operation plan, while associating these with each other. Then, as for the other initial operation plans, the corrected operation evaluation table 118 similarly stores the initial operation plan, the supply and demand scenario, and the evaluation value of the optimal corrected operation plan relative to the initial operation plan P while associating these with each other.

FIG. 24 is a diagram depicting an example of the flexibility evaluation table. For example, the flexibility evaluation table 119 stores the initial operation plan "1", the supply and demand scenario "1", and the flexibility evaluation "2" relative to the initial operation plan P while associating these with each other. In other words, in the flexibility evaluation table 119, the deviation from the ideal value of the cost reduction effect in the case of operating the storage battery according to the initial operation plan "1" relative to the supply and demand scenario "1" is 2,000,000 yen. The flexibility evaluation table 119 stores the other supply and demand scenarios and the flexibility evaluation relative to the other initial operation plans P on the initial operation plan "1" while associating these with each other. Thus, the flexibility evaluation table 119 stores the plural supply and demand scenarios and the flexibility evaluations relative to the plural initial operation plans P with respect to one initial operation plan. Then, as for the other initial operation plans, the flexibility evaluation table 119 similarly stores the initial operation plan, the supply and demand scenario, and the flexibility evaluation on the initial operation plan P while associating these with each other.

Thus, even when the cost reduction effect is employed, the operation plan preparation device 100 stores the supply and demand scenario, the evaluation value by the optimal operation plan, and the optimal control parameter representing the best evaluation value in the optimal operation evaluation table 116 illustrated in FIG. 22 while associating these with each other. Moreover, the operation plan preparation device 100 stores the initial operation plan, the supply and demand scenario, and the evaluation value of the optimal corrected operation plan relative to the initial operation plan P in the corrected operation evaluation table 118 illustrated in FIG. 23 while associating these with each other. The operation plan preparation device 100 evaluates the flexibility by calculating the difference between the evaluation value by the optimal operation plan illustrated in the optimal operation evaluation table 116 of FIG. 22 and the evaluation value of the optimal corrected operation plan relative to the initial operation plan P illustrated in the corrected operation evaluation table 118 of FIG. 23. Thus, the operation plan preparation device 100 can prepare the operation plan in which the effect close to the best cost reduction effect is obtained under any weather change.

In each process described in Embodiment 1, all of or a part of the process described as being automatically performed can be performed manually; alternatively, all of or a part of the process described as being manually performed can be performed automatically by a known method. For example, in FIG. 1, the case of automatically performing the process of the optimal plan selection unit 126 has been described; however, this process can be performed manually. Specifically, the optimal plan selection unit 126 can allow a user to manually select the best operation plan by outputting the diagram representing the distribution of the flexibility for each initial operation plan candidate on the output device 102. Moreover, the information including various data and parameters such as the process procedure, the control procedure, and the specific name represented in the above text or drawings can be arbitrarily changed unless otherwise stated. For example, the optimal operation evaluation table illustrated in FIG. 5 does not always need to store the optimal control parameters.

Moreover, the component elements of the operation plan preparation device 100 illustrated in FIG. 1 are the components illustrated schematically, and the operation plan preparation device 100 does not always need to be configured physically as illustrated in the drawings. In other words, the specific mode of dispersion and integration of the operation plan preparation device 100 is not limited to the mode depicted in the drawings, and the operation plan preparation device 100 can be configured by physically or functionally dispersing or integrating all of or a part of the component elements in arbitrary unit according to various loads or use circumstances, etc. For example, the optimal evaluation value calculation unit 123 and the corrected evaluation value calculation unit 124 illustrated in FIG. 1 can be integrated in the configuration.

The operation plan preparation device 100 can be achieved by mounting each function of the operation plan preparation device 100 in a known information processing device. The known information processing device corresponds to, for example, a personal computer, a work station, a mobile phone, a PHS (Personal Handy-phone System) terminal, a mobile communication terminal, a PDA (Personal Digital Assistant), or other devices.

Figure 25:
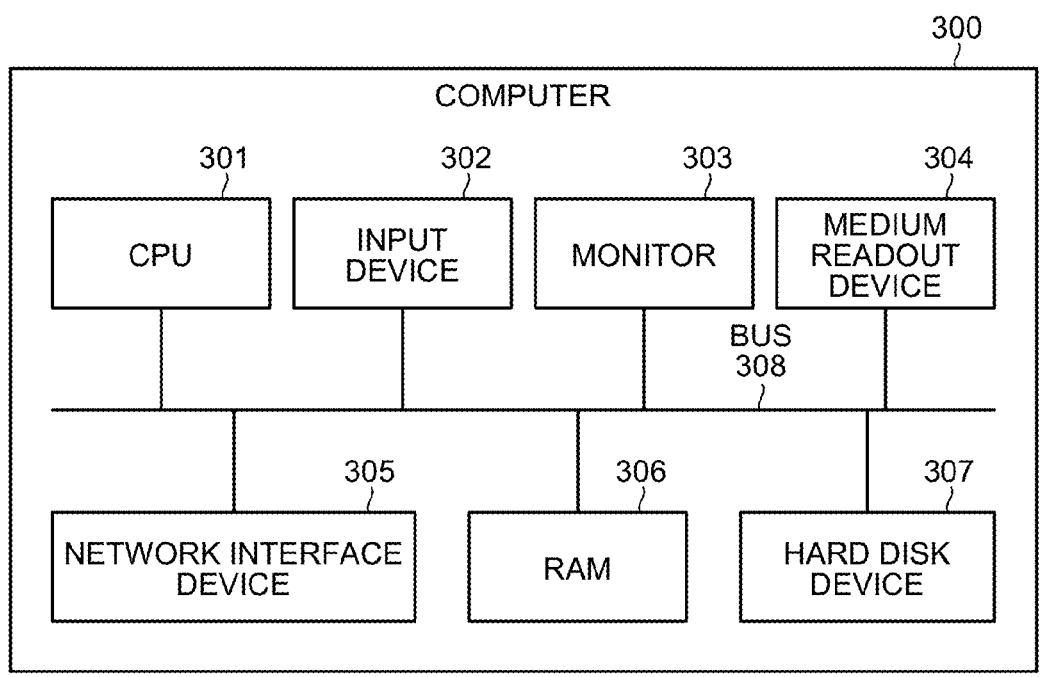
FIG. 25 is a diagram depicting an example of a computer executing an operation plan preparation program.

FIG. 25 is a diagram depicting an example of a computer for executing the operation plan preparation program. As depicted in FIG. 25, a computer 300 includes a CPU 301 for executing each calculation process, an input device 302 for receiving the input of data from a user, and a monitor 303. The computer 300 includes a medium readout device 304 for reading out a program, etc. from a storage medium, and a network interface device 305 for exchanging data with other devices. The computer 300 includes RAM (Random Access Memory) 306 for storing various kinds of information temporally, and a hard disk device 307. Each of the devices 301 to 307 is connected to a bus 308.

The hard disk device 307 stores an operation plan preparation program having the similar functions to the processing units of the supply and demand scenario generation unit 122, the optimal evaluation value calculation unit 123, the corrected evaluation value calculation unit 124, the flexibility calculation unit 125, and the optimal plan selection unit 126 illustrated in FIG. 1. The hard disk device 307 stores various kinds of data for achieving the operation plan preparation program. The various kinds of data include, for example, the demand data 111a and the solar radiation quantity data 112.

The CPU 301 allows the operation plan preparation program to function as an operation plan preparation process by reading out the operation plan preparation program from the hard disk device 307, developing the operation plan preparation program on the RAM 306, and executing the operation plan preparation program. In other words, the operation plan preparation program functions as the similar process to the processing units of the supply and demand scenario generation unit 122, the optimal evaluation value calculation unit 123, the corrected evaluation value calculation unit 124, the flexibility calculation unit 125, and the optimal plan selection unit 126 illustrated in FIG. 1.

The operation plan preparation program does not always need to be stored in the hard disk device 307. For example, the program stored in a computer-readable storage medium may be read out and executed by the computer 300. The computer-readable storage medium corresponds to, for example, a portable storage medium such as a CD-ROM, a DVD disk, or a USB memory, a semiconductor memory such as a flash memory, a hard disk drive, or the like. Alternatively, this program may be stored in a device connected via a public network, the Internet, a LAN (Local Area Network), a WAN (Wide Area Network) or the like and the program may be read out and executed by the computer 300 from the device via any of these networks.

Embodiment 3

The embodiment of the storage battery operation plan according to the present invention has been described so far; however, the present invention is not limited thereto, and the present invention can be applied to the case of preparing an operation plan for an appliance whose adjustment of the operation status according to the transition of the demand is effective. In view of this, the description is hereinafter made of the embodiment of optimizing the operation plan for adjusting the number of operating communication base stations from the viewpoint of the reduction of energy requested for the operation of the communication base station of the operation plan according to the transition of the communication demand.

First, with reference to FIGS. 26 to 30, the preparation of the operation plan assumed in this embodiment is described.

Figure 26:
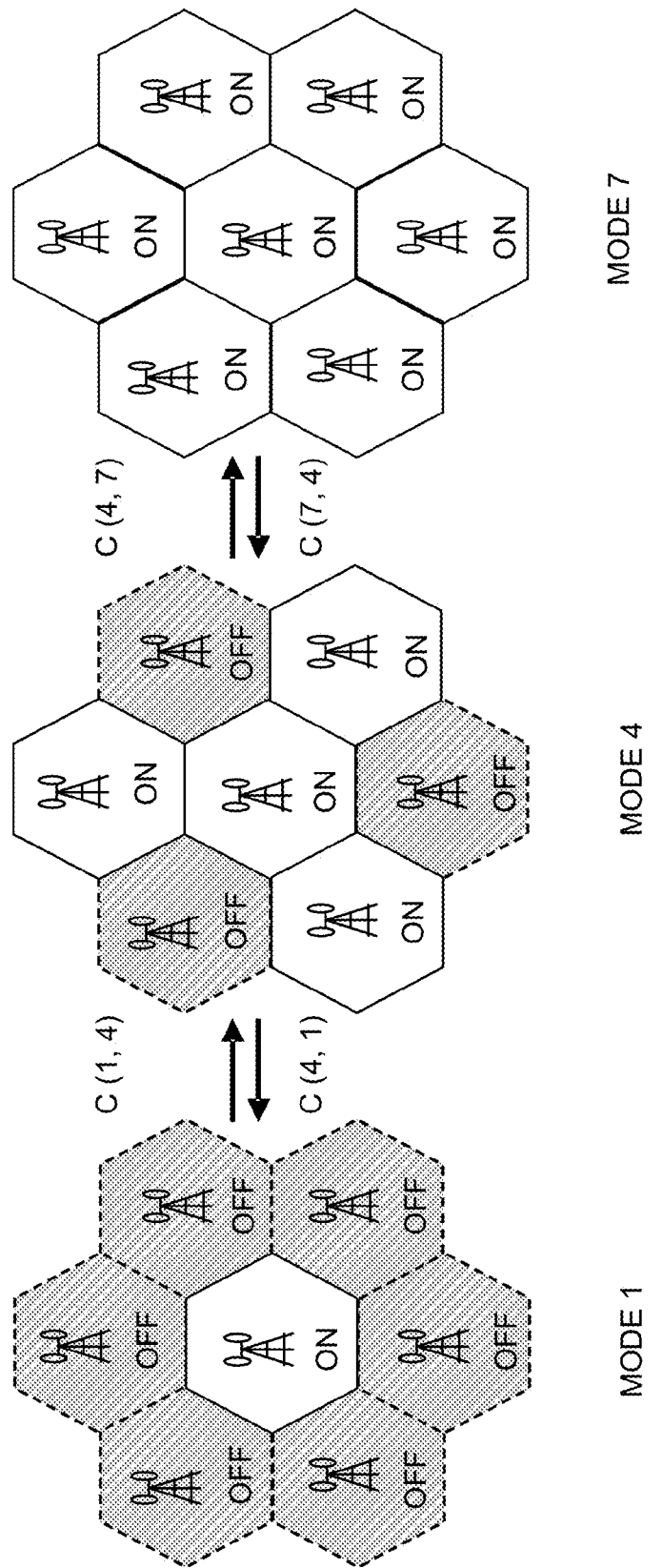
FIG. 26 is a diagram for describing an operation mode of a communication base station.
Figures 27, 28:
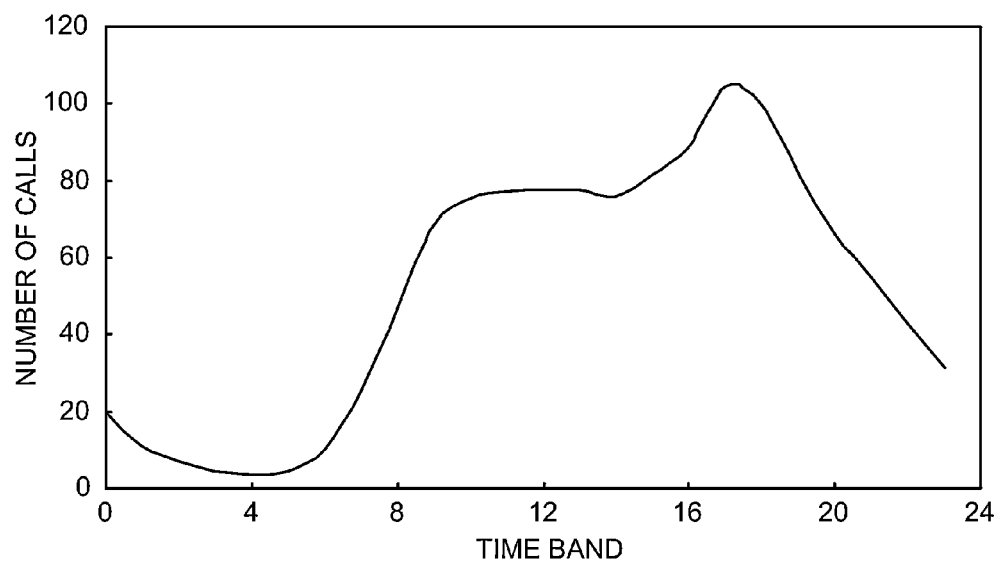
FIG. 27 is a diagram depicting an example of an operation plan of a communication base station.
FIG. 28 is a diagram depicting an example of the transition of the communication demand.

FIG. 26 is a schematic diagram of the adjustment of the number of operating communication base stations assumed in this example. In the drawing, a region composed of seven hexagons is a region to be covered by a communication base station. In a Mode 1 on the leftmost side, the entire target region is covered by one base station; similarly, in a Mode 4 on the right side of the Mode 1, the region is covered by four base stations and in a Mode 7, the region is covered by seven base stations. In this example, a plan of designating which one of the above three modes is employed for each preset time period as illustrated in FIG. 27 is referred to as an operation plan. An object is to provide the operation plan that allows the operation with energy close to the minimum energy that can be achieved in the case where the transition is predicted, even if any of the transitions of communication demand expected in a day is realized.

FIG. 28 represents the typical data of the transition of communication demand of a day assumed in this example. Based on this transition, in this example, the operation is conducted on any one of the modes illustrated in FIG. 26 while selecting one of five time periods illustrated in FIG. 27. As for the time periods, 0:00 to 6:00 is the time period with small communication demand, 6:00 to 10:00 is the time period in which the communication demand is on the increase, 10:00 to 14:00 is the time period in which the communication demand is stable in a relatively high level, 14:00 to 18:00 is the time period in which the communication demand is increasing toward the peak, and 18:00 to 24:00 is the time period in which the communication demand is decreasing from the peak.

Figure 29:
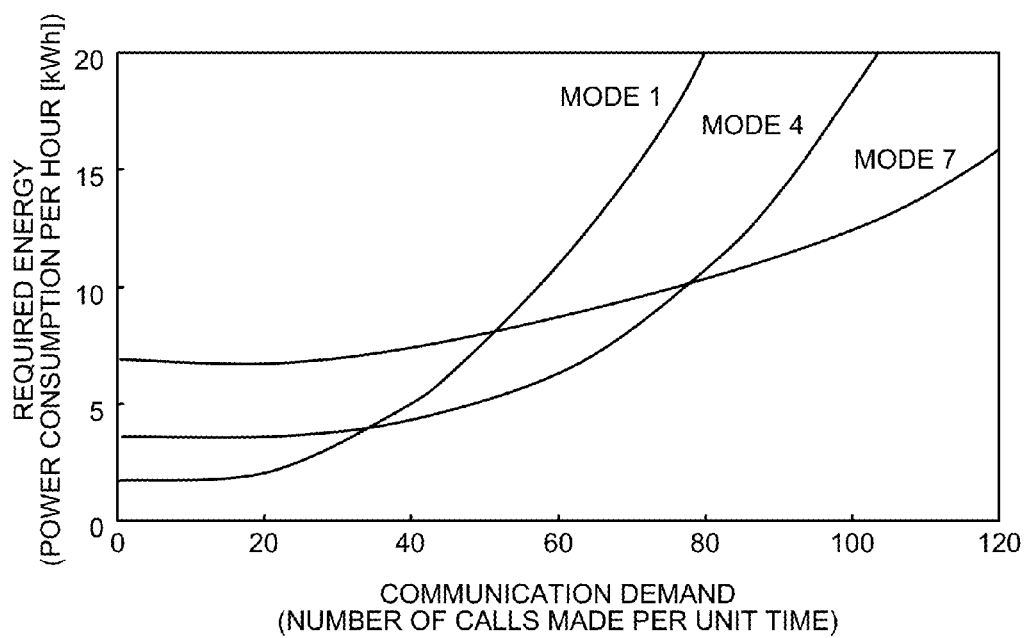
FIG. 29 is a diagram for describing the amount of energy requested for dealing with the communication demand.

FIG. 29 is a graph representing the relation between the communication demand and the amount of energy requested for dealing with the communication demand (power consumption per unit time) for each of the operation modes. The horizontal axis represents the quantity of the communication demand. As the index of the communication demand, various indices such as the number of calls made by users (mobile terminals) per unit time (for example, for several minutes) or the communication traffic volume or the combination of those indices are given; in this example, the number of calls made per unit time is used for simplifying the description. The vertical axis represents the amount of energy requested for dealing with the communication demand in the unit of electric energy consumed by the base station per hour. For example, if the state that approximately 20 calls are made per unit time continues for an hour, the electric energy of approximately 1.5 kWh is consumed in Mode 1 and the electric energy more than in Mode 1, approximately 3 kWh, is consumed in Mode 4. If approximately 35 calls or more are made, Mode 4 consumes less electric energy than Mode 1. In the operation plan preparation of this example, the appropriate selection of the operation mode in which the relation with the energy efficiency is different depending on the communication demand in consideration of the transition of the communication demand expected in each time period is one of important points.

FIG. 30 is a chart for describing an example of the cost requested for switching the operation mode, which is another energy amount to be considered in the preparation of the operation plan in this example. For example, the first line represents the cost for switching the mode of the appliance from Mode 1 to Mode 4 and corresponds to the C (1, 4) of FIG. 26. In this example, it is premised that this cost data are available based on the past result data or simulation, etc.

Next, the results of applying the present invention for preparing the operation plan of the communication base station described above are explained.

The range of the candidates for the operation plan assumed in this example is as illustrated in FIG. 27. This covers the search range illustrated in FIG. 31. The search range of FIG. 31 is obtained by selecting the operation mode, which is worth consideration, according to each time period based on the transition of the communication demand illustrated in FIG. 28. Note that the combinations among all the modes may be employed as the candidates for the operation plan without considering the search range of FIG. 28.

The process procedure is described using the example of determining the operation mode of 6:00 to 10:00 just before the time period of 6:00 to 10:00.

First, in this example, the scenario of the transition of the communication demand that could occur is generated according to the similar procedure to the photovoltaic power generation output fluctuation scenario. FIG. 32 depicts an example of the fluctuation probability table for generating the communication demand scenario. In FIG. 32, "0-20", "20-40", "40-60", "60-80", and "80-" in the horizontal direction represent the number of calls made per unit time. $N(\mu, \sigma)$ expresses that the values randomly generated according to the Gaussian distribution of the mean value $\mu$ and the standard deviation $\sigma$ are used as the values after the fluctuation. The probability value and the values $\sigma1$ to $\sigma5$ in this chart may be calculated based on the statistical analysis of the past communication demand data. Although one fluctuation probability table is used in the generation of the photovoltaic power generation output fluctuation scenario, the fluctuation probability table as illustrated in FIG. 32 is prepared based on the past data and used for each of the five time periods in this example. In this example, the operation mode for 6:00-10:00 (operation plan from 6:00 to 6:00 on the next day) is prepared; therefore, the value of the communication demand just before 6:00 is used as the default value for the generation of the communication demand.

Next, as for each of the prepared communication demand scenarios, the optimal operation plan (plan for switching the operation mode of the communication device) is prepared according to the similar procedure to the preparation of the optimal operation plan for the storage battery relative to the supply and demand scenario. In the evaluation of the operation plan requested for the preparation of the optimal operation plan, the evaluation value calculated based on the following formula is used.

$$\text{(Power consumption)} = \Sigma i(\Sigma t E(D\_t, \text{Mode}\_i)) + \Sigma i C(\text{Mode}\_i, \text{Mode}\_(i+1)) \quad (8)$$

In the formula (8), i represents the index relative to each of the aforementioned time periods, and t represents the index corresponding to the time at intervals of unit time (for example 10 minutes) in each time period. In this example, 6:00 to 10:00 is considered as the first time period and 0:00 to 6:00 on the next day is handled as the last time period. $D\_t$ is the communication peak demand at the time corresponding to t, and this is the value determined by the communication scenario as a target of the evaluation. Mode_i is the operation mode specified according to the time period i in the operation plan as the target of the evaluation. $E(D\_t, \text{Mode}\_i)$ is the electric energy consumed in the operation mode Mode_i when the communication peak demand of $D\_t$ continues for a unit time, and its value is calculated based on the data of FIG. 29. C( ) represents the cost for switching of the operation mode, and its value is calculated based on the 30 data (0 if the operation mode is not switched). The power consumption calculated here corresponds to the evaluation value. In other words, this evaluation value is preferably smaller.

FIG. 33 depicts an example of the prepared optimal operation plan. In the drawing, the first number in the column of "optimal operation plan" corresponds to the operation plan ID. In the parenthesis, the information added for the explanation is represented; specifically, how to switch the operation mode from the 6:00-10:00 time period as the first number to the 0:00-6:00 time period on the next day is represented. For example, the operation plan denoted by ID14 indicates that the operation is conducted by Mode 4 for 6:00-10:00, Mode 4 for 10:00-14:00, Mode 7 for 14:00-18:00, Mode 4 for 18:00-24:00, and Mode 1 for 0:00-6:00 on the next day.

Finally, the evaluation value in the case of realizing each communication demand scenario on the two candidates Mode 1 and Mode 4 of the operation mode for the 6:00-10:00 time period is calculated through the similar procedure to the evaluation of the initial operation plan of the storage battery. The formula for calculating the evaluation value used in the evaluation is the same as the above formula (8). For example, the evaluation value if the communication demand scenario "1" is realized on the candidate Mode 1 is 204. Here, the difference between the evaluation value calculated here and the evaluation value by the optimal operation plan corresponds to the regret value. For example, the regret value if the communication demand scenario "1" is realized on the candidate Mode 1 is 204−160=44. In this example, if the operation mode for the 6:00-10:00 time period of the optimal operation plan relative to each scenario coincides with the operation mode as the target of the evaluation, the regret value is 0; thus, the simulation can be omitted.

FIG. 34 depicts the result of the evaluation. The best operation plan (operation mode for 6:00-10:00) of the worst evaluation value relative to the communication demand scenario is selected based on this evaluation result, for example. Thus, even if any communication demand scenario is realized, it is assured that the operation can be conducted at the energy as small as the minimum energy that could be achieved if the transition were predicted, by correcting the operation plan at 10:00.

According to an aspect of the technique to be disclosed in the present application, an advantageous effect is provided that an operation plan capable of dealing with any weather change can be prepared.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An operation plan preparation method to be executed by a computer, the operation plan preparation method comprising:
   generating a plurality of scenarios representing the possible set of supply and demand power curves that could occur under a given condition using a processor;
   first calculating, for every plural scenarios, an optimal operation plan by which the best evaluation value for a scenario in operation of a storage battery is obtained, and recording the evaluation value of the optimal operation plan as a first evaluation value of the scenario using the processor;
   second calculating, for every combination of plural operation plan candidates and plural scenarios, a second evaluation value for an operation plan candidate in the case when a scenario occurs in the operation of the storage battery using the processor;
   third calculating, for the every plural operation plan candidates, a difference between the first evaluation value and the second evaluation value on each scenario using the processor; and
   selecting the operation plan for the storage battery from among the plural operation plan candidates based on the difference using the processor.

2. The operation plan preparation method according to claim 1, wherein the generating includes generating the scenarios based on a weather change model in which change of weather per unit time is modeled using the processor.

3. The operation plan preparation method according to claim 1, wherein the second calculating includes:
   preparing, for every plural operation plan candidates, an optimal corrected operation plan representing an optimal operation plan after a correction time based on an amount of power left in the storage battery in the operation of the storage battery till the correction time according to the operation plan candidate using the processor; and
   calculating an evaluation value on the prepared optimal corrected operation plan as the second evaluation value using the processor.

4. An operation plan preparation device comprising:
   a memory; and
   a processor coupled to the memory, wherein the processor executes a process including:
   generating a plurality of scenarios representing the possible set of supply and demand power curves that could occur under a given condition;
   first calculating, for every plural scenarios, an optimal operation plan by which the best evaluation value for a scenario in operation of a storage battery is obtained, and recording the evaluation value of the optimal operation plan as a first evaluation value of the scenario;
   second calculating, for every combination of plural operation plan candidates and plural scenarios, a second evaluation value for an operation plan candidate in the case when a scenario occurs in the operation of the storage battery;
   third calculating, for the every operation plan candidates, a difference between the first evaluation value and the second evaluation value relative to each scenario; and
   selecting the operation plan of the storage battery from among the plural operation plan candidates based on the difference.

5. The operation plan preparation device according to claim 4, wherein the generating includes generating the scenarios based on a weather change model in which change of weather per unit time is modeled.

6. The operation plan preparation device according to claim 4, wherein the second calculating includes preparing, for every plural operation plan candidates, an optimal corrected operation plan representing an optimal operation plan after a correction time based on an amount of power left in the storage battery in the operation of the storage battery till the correction time according to the operation plan candidate, and calculating an evaluation value on the prepared optimal corrected operation plan as the second evaluation value.

7. A non-transitory computer-readable recording medium having stored therein a program that causes a computer to execute an operation plan preparation process comprising:
   generating a plurality of scenarios representing the possible set of supply and demand power curves that could occur under a given condition;
   first calculating, for every plural scenarios, an optimal operation plan by which the best evaluation value for a scenario in operation of a storage battery is obtained, and recording the evaluation value of the optimal operation plan as a first evaluation value of the scenario;
   second calculating, for every combination of plural operation plan candidates and plural scenarios, a second evaluation value for an operation plan candidate in the case when a scenario occurs in the operation of the storage battery;
   third calculating, for the every plural operation plan candidates, a difference between the first evaluation value and the second evaluation value on each scenario; and
   selecting the operation plan of the storage battery from among the plural operation plan candidates based on the difference.

8. The non-transitory computer-readable recording medium according to claim 7, wherein the generating includes generating the scenarios based on a weather change model in which change of weather per unit time is modeled.

9. The non-transitory computer-readable recording medium according to claim 7, wherein the second calculating includes:
- preparing, for every plural operation plan candidates, an optimal corrected operation plan representing an optimal operation plan after a correction time based on an amount of power left in the storage battery in the operation of the storage battery till the correction time according to the operation plan candidate; and
- calculating an evaluation value on the prepared optimal corrected operation plan as the second evaluation value.

* * * * *